(12) United States Patent
Kim

(10) Patent No.: US 11,737,505 B2
(45) Date of Patent: Aug. 29, 2023

(54) APPARATUS FOR MANUFACTURING HAIR CAP

(71) Applicant: Ik Hyun Kim, Seoul (KR)

(72) Inventor: Ik Hyun Kim, Seoul (KR)

(*) Notice: Subject to any disclaimer, the term of this patent is extended or adjusted under 35 U.S.C. 154(b) by 351 days.

(21) Appl. No.: 17/273,582

(22) PCT Filed: Aug. 7, 2019

(86) PCT No.: PCT/KR2019/009853
§ 371 (c)(1),
(2) Date: Mar. 4, 2021

(87) PCT Pub. No.: WO2020/054976
PCT Pub. Date: Mar. 19, 2020

(65) Prior Publication Data
US 2021/0195984 A1    Jul. 1, 2021

(30) Foreign Application Priority Data

Sep. 10, 2018 (KR) .................. 10-2018-0107745
Jul. 12, 2019 (KR) .................. 10-2019-0084524

(51) Int. Cl.
*A42C 5/00* (2006.01)
(52) U.S. Cl.
CPC .................... *A42C 5/00* (2013.01)
(58) Field of Classification Search
CPC ........... A42C 5/00; B29C 65/18; B29C 65/48; B29C 66/7294
USPC ....................................................... 156/433
See application file for complete search history.

(56) References Cited

U.S. PATENT DOCUMENTS 10,694,800 B2 * 6/2020 Lau .................. B29C 65/08

FOREIGN PATENT DOCUMENTS

| JP | 6142374 A | 5/1994 |
| JP | 7196154 A | 8/1995 |
| JP | 9173732 A | 7/1997 |
| JP | 2003117736 A | 4/2003 |
| JP | 2007-138373 A | 6/2007 |

(Continued)

OTHER PUBLICATIONS

International Search Report issued for PCT/KR2019/009853, dated Nov. 19, 2019, with English translation.

(Continued)

*Primary Examiner* — James D Sells
(74) *Attorney, Agent, or Firm* — Westman, Champlin & Kochler, P.A.; Amanda M. Prose

(57) ABSTRACT

Proposed is an apparatus for manufacturing a hair cap. A rubber band mounting unit is formed on one side of the top surface of the workbench. A rubber band conveying unit is formed on the top surface of the workbench and grips the expanded rubber band. A nonwoven fabric cutting unit is formed on the other side of the top surface of the workbench to cut a nonwoven fabric. A nonwoven fabric fusing unit couples the rubber band, conveyed by the rubber band conveying unit, to the nonwoven fabric. A driving unit makes the rubber band conveying unit reciprocate to the rubber band mounting unit or the nonwoven fabric fusing unit. A collecting unit grips and collects the fused hair cap. Processes for placing the rubber band on the peripheral edge of the nonwoven fabric and bonding same are performed rapidly in succession.

17 Claims, 34 Drawing Sheets

(56) References Cited

FOREIGN PATENT DOCUMENTS

| JP | 3194440 U | 11/2014 |
| JP | 6084043 B2 | 2/2017 |
| KR | 10-2005-0001297 A | 1/2005 |
| KR | 10-2013-0024510 A | 3/2013 |
| KR | 10-2013-0042917 A | 4/2013 |
| KR | 10-2013-0115905 A | 10/2013 |
| KR | 10-2017-0124463 B1 | 7/2018 |

OTHER PUBLICATIONS

Written Opinion of the International Searching Authority issued for PCT/KR2019/009853, dated Nov. 19, 2019.
Decision to Grant a Patent issued for KR patent application serial No. 10-2018-0107745, dated Feb. 13, 2020, with English translation.

* cited by examiner

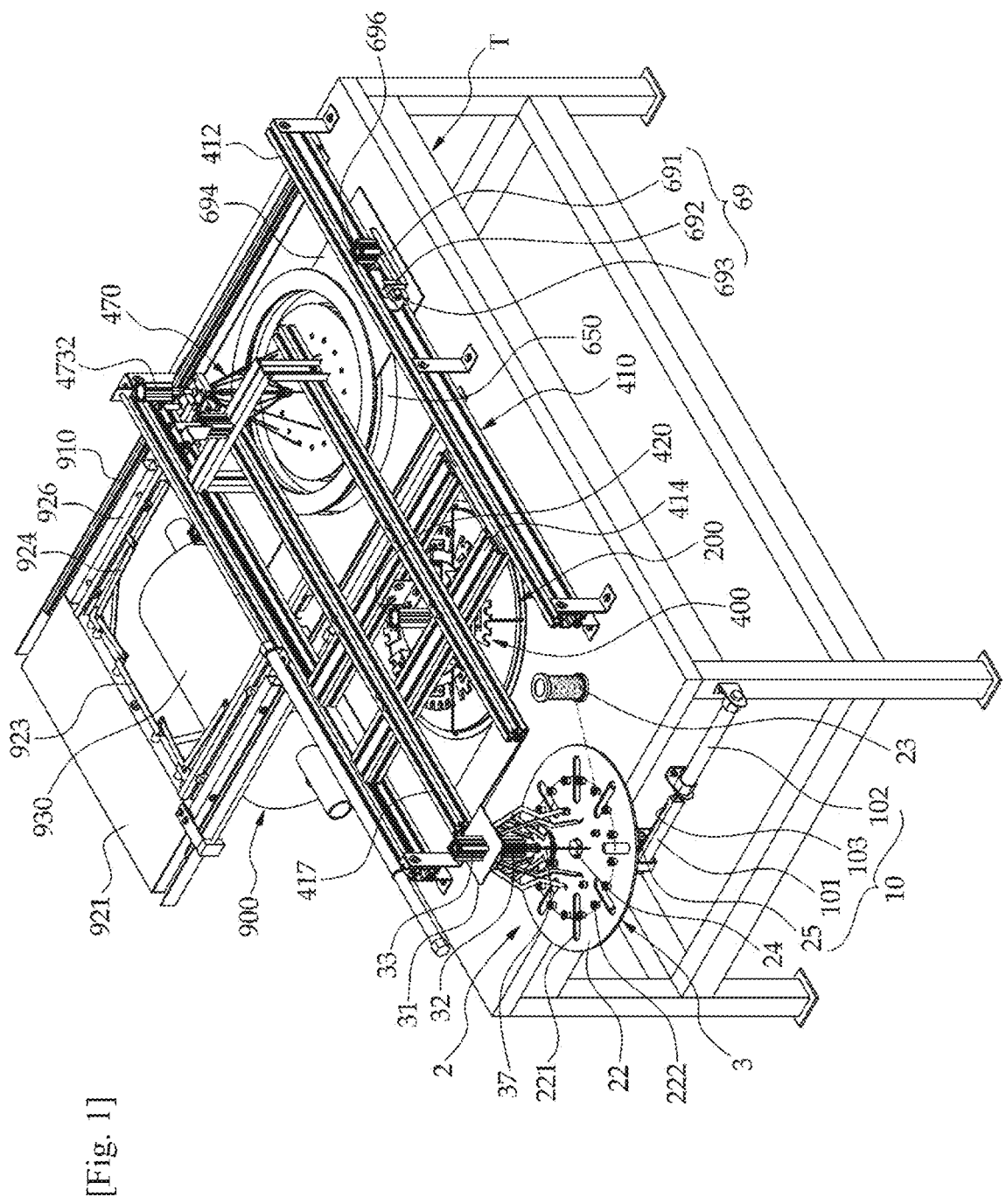
[Fig. 1]

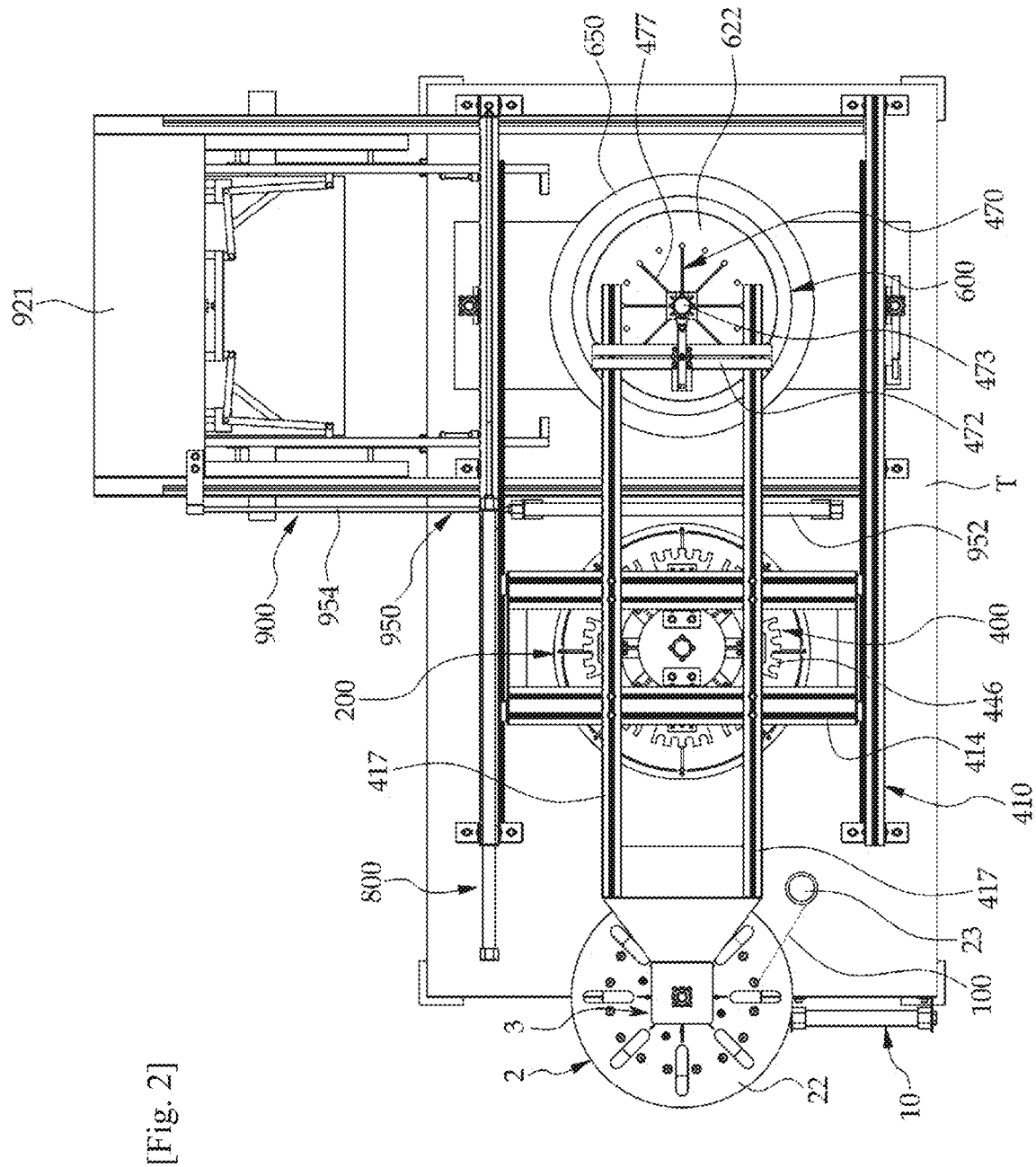
[Fig. 2]

[Fig. 3]
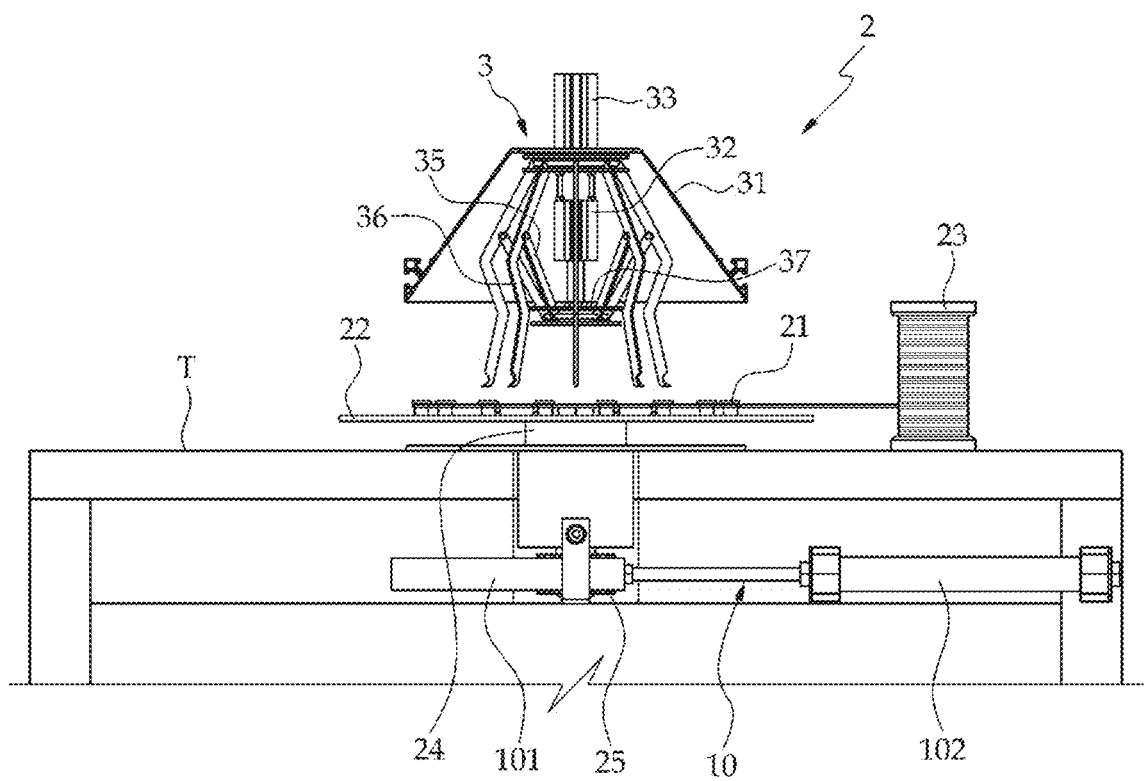

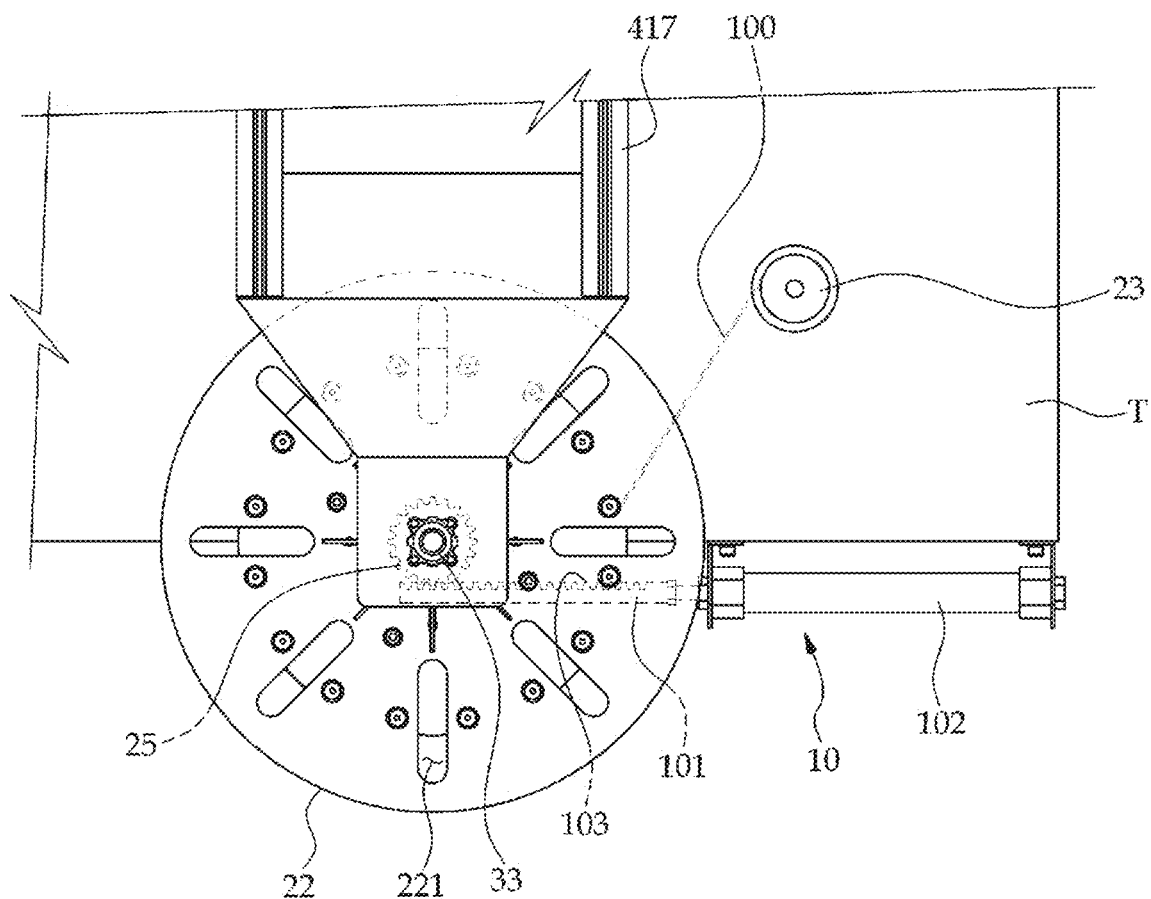
[Fig. 4]

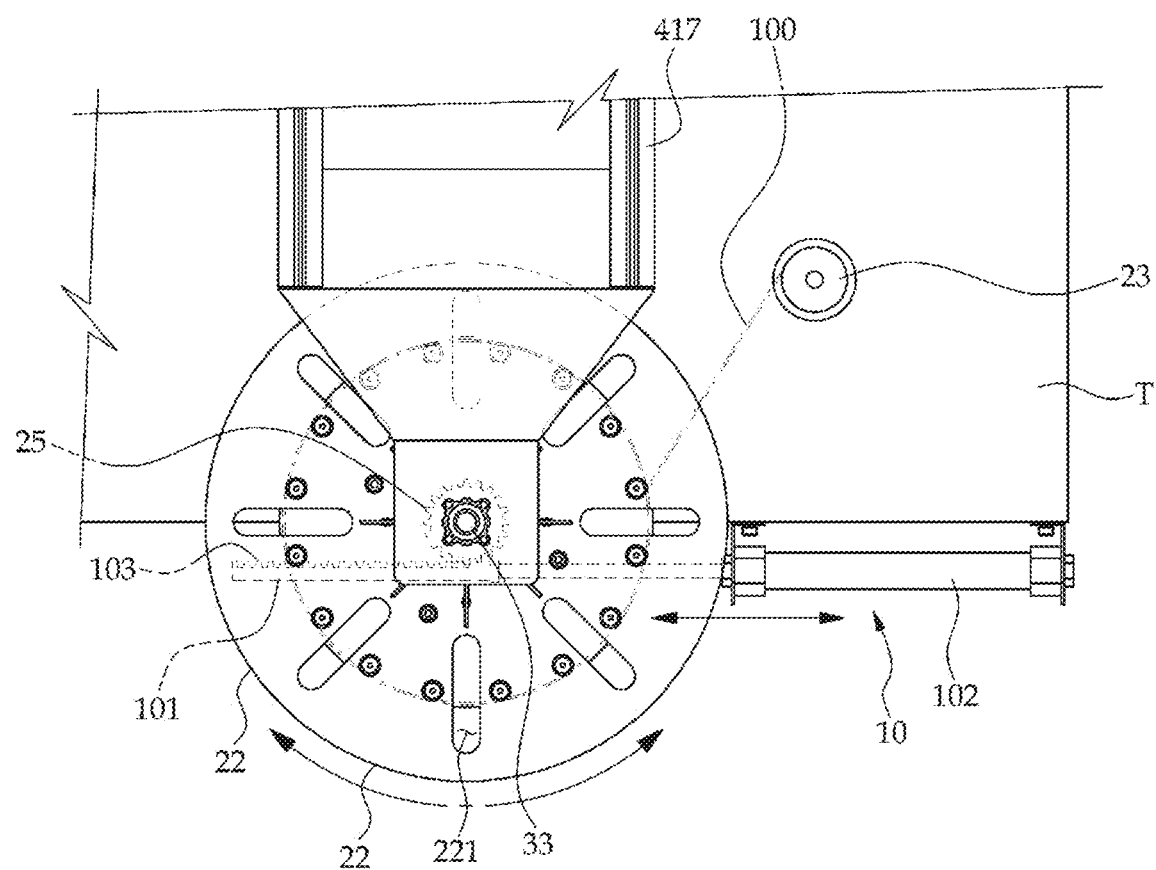
[Fig. 5]

[Fig. 6]
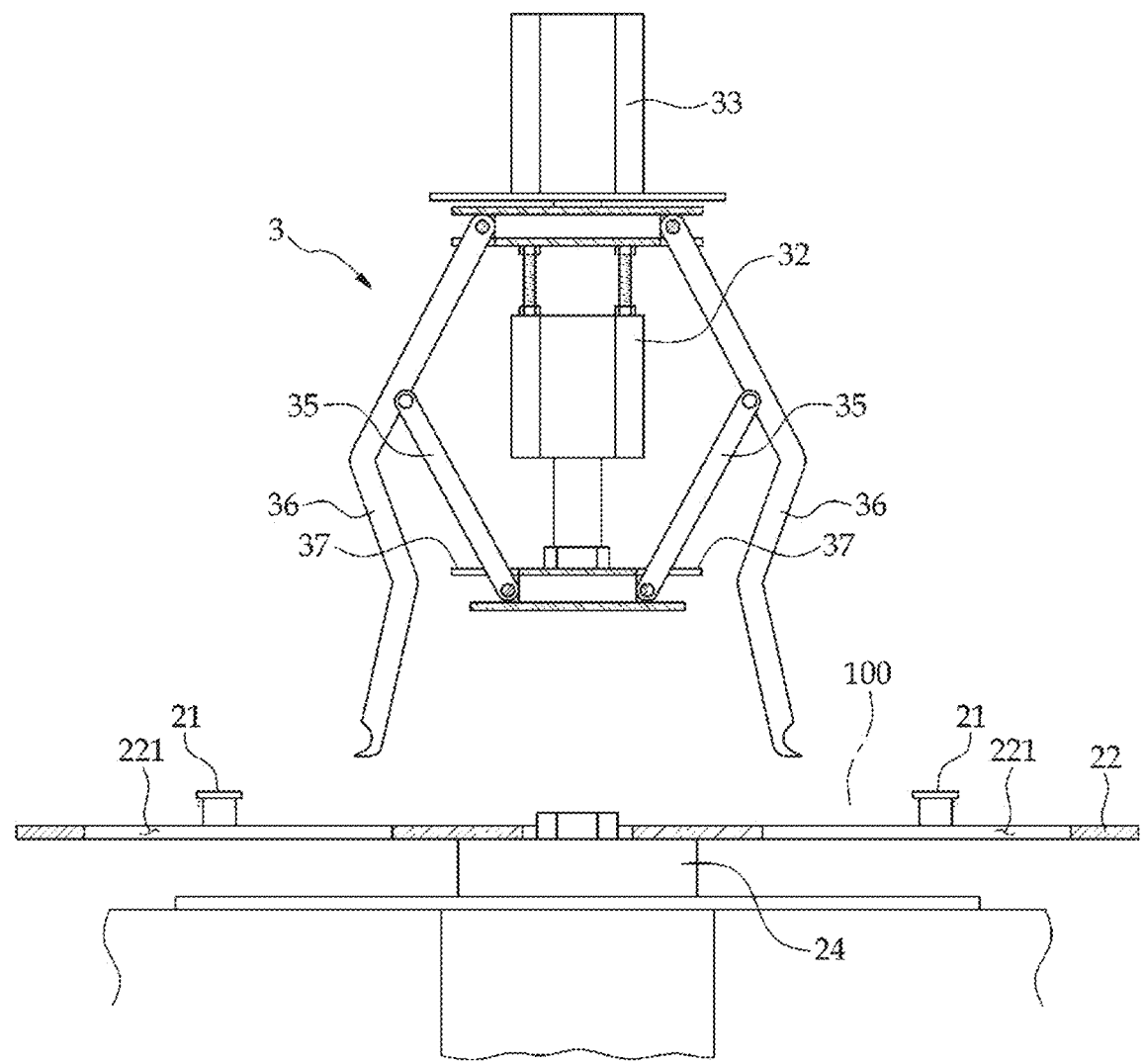

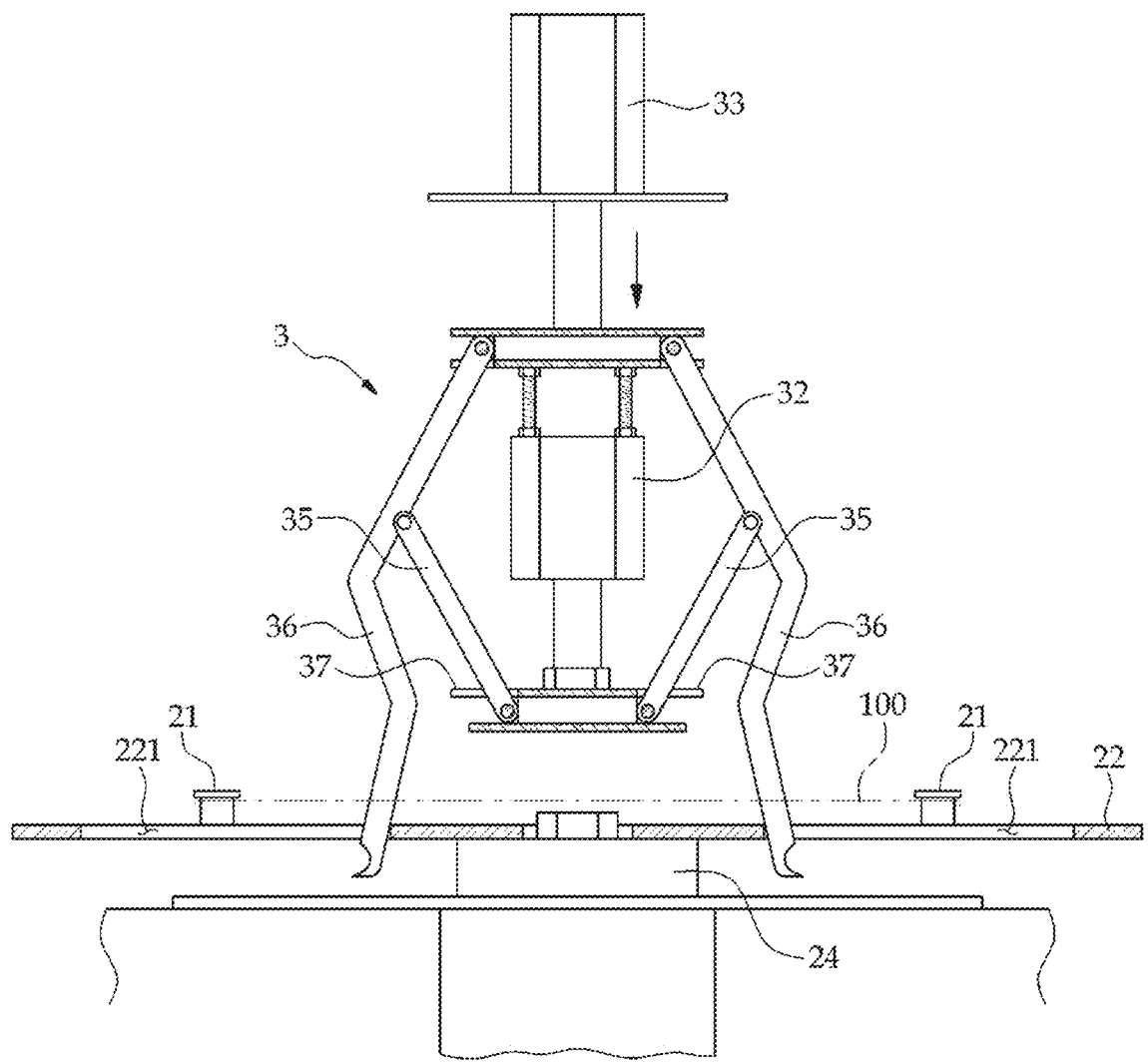
[Fig. 7]

[Fig. 8]
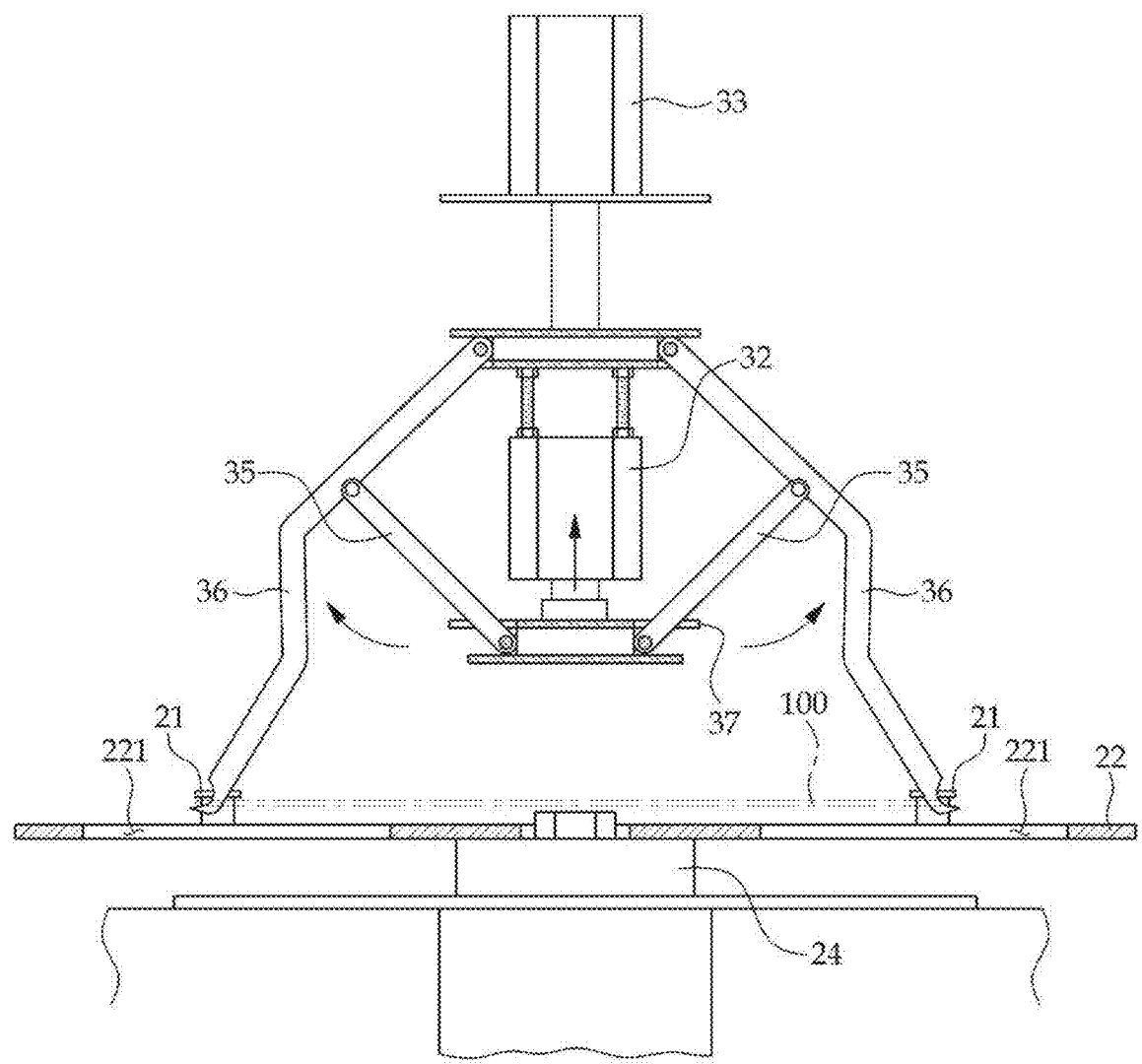

[Fig. 9]
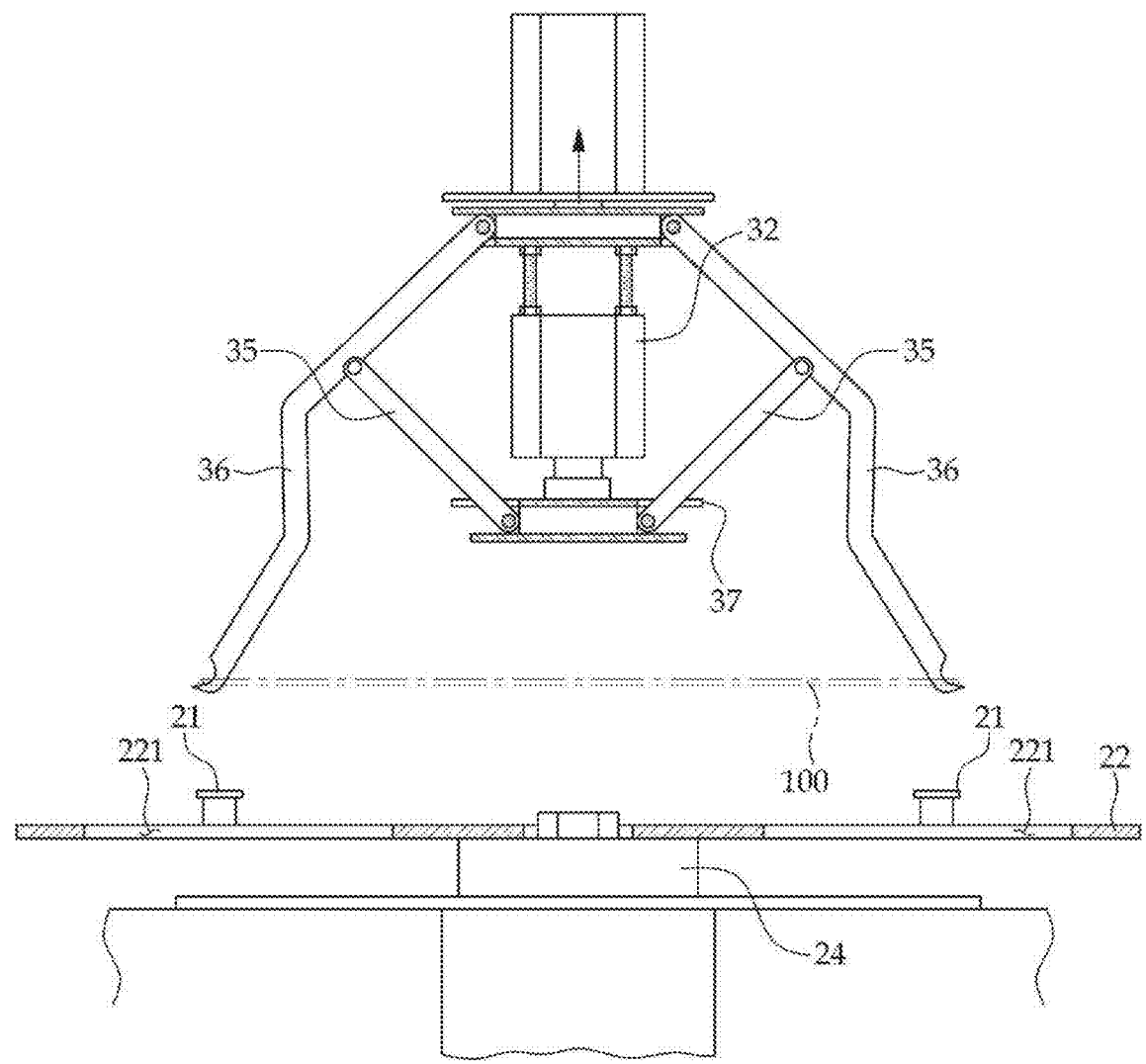

[Fig. 10]
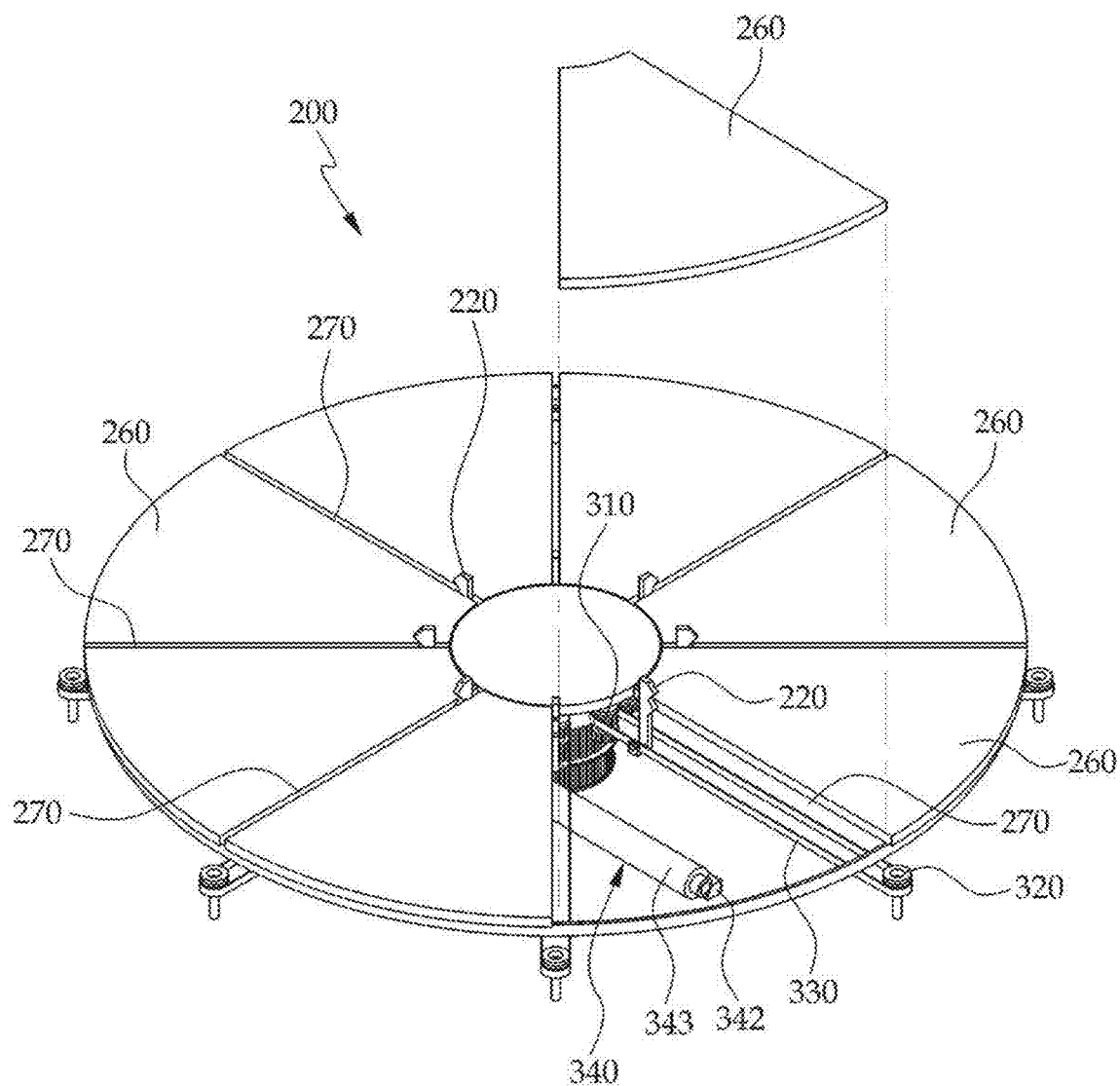

[Fig. 11]
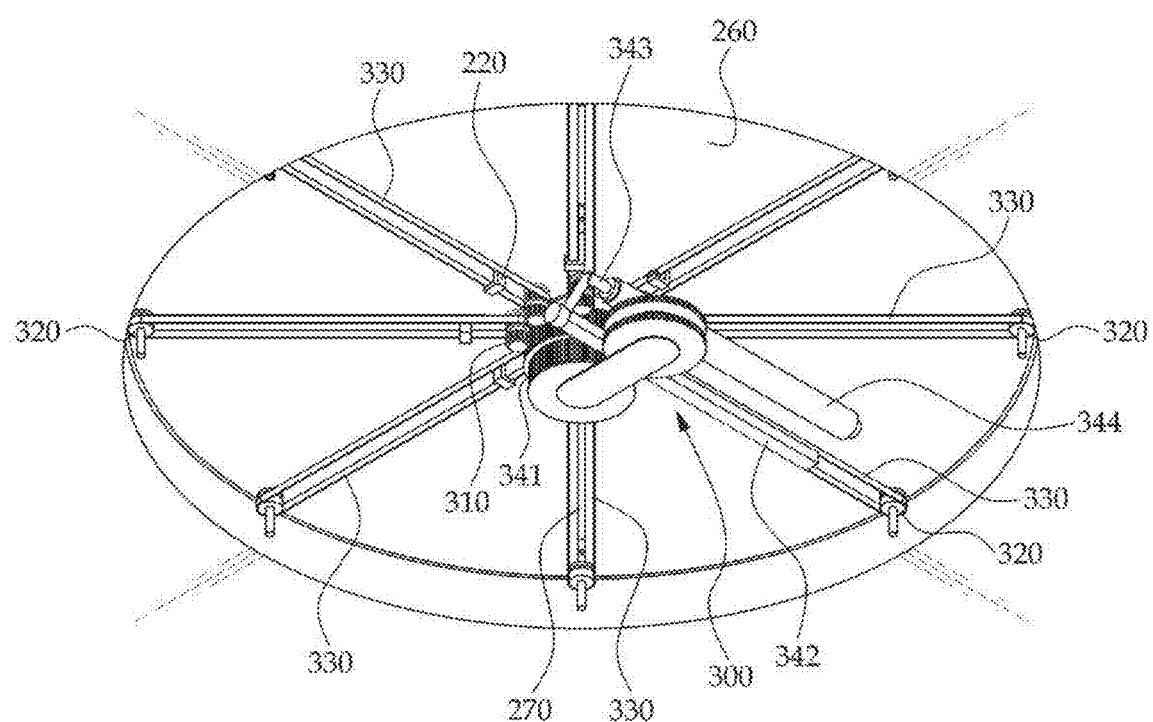

[Fig. 12]
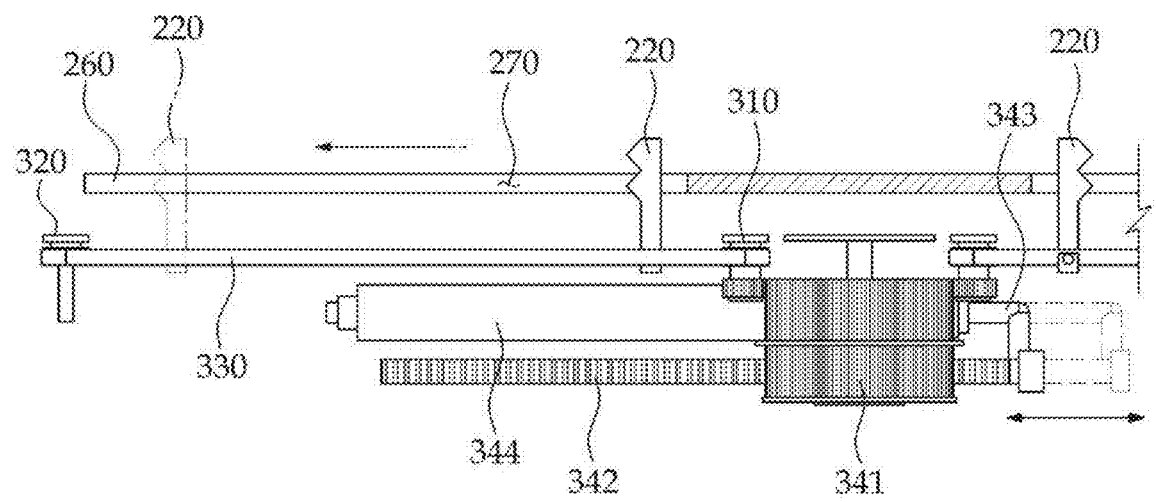

[Fig. 13]
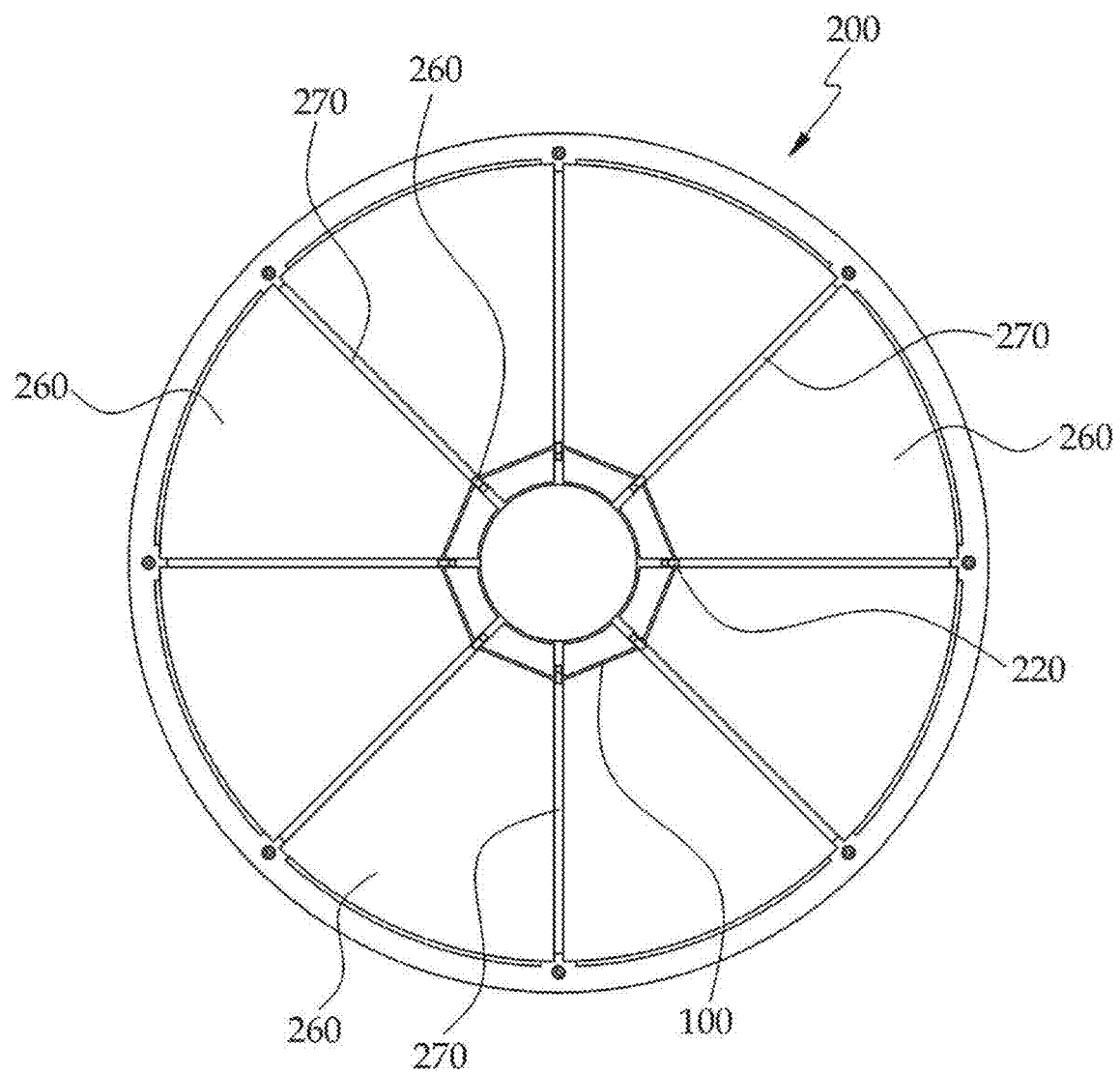

[Fig. 14]
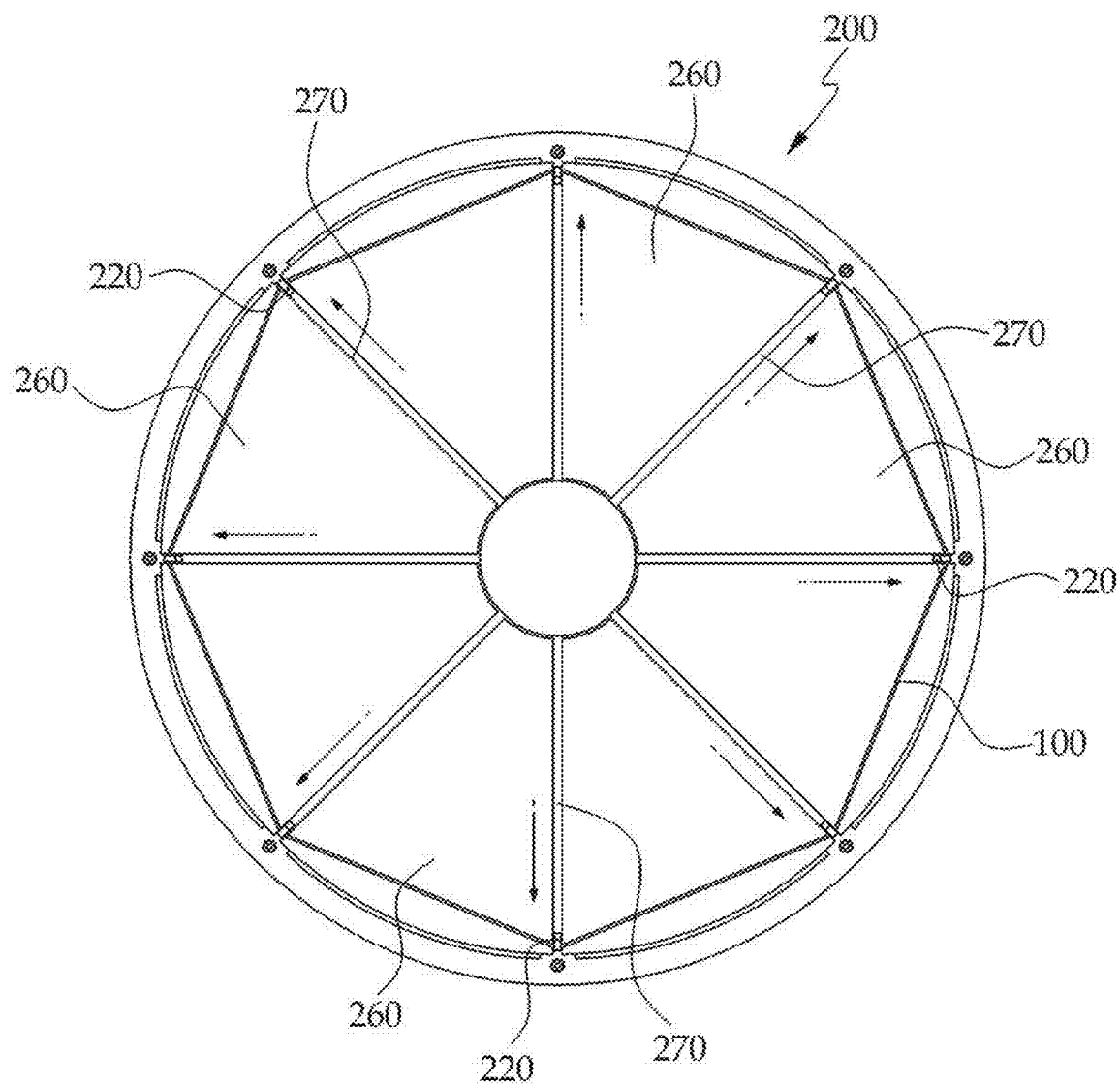

[Fig. 15]
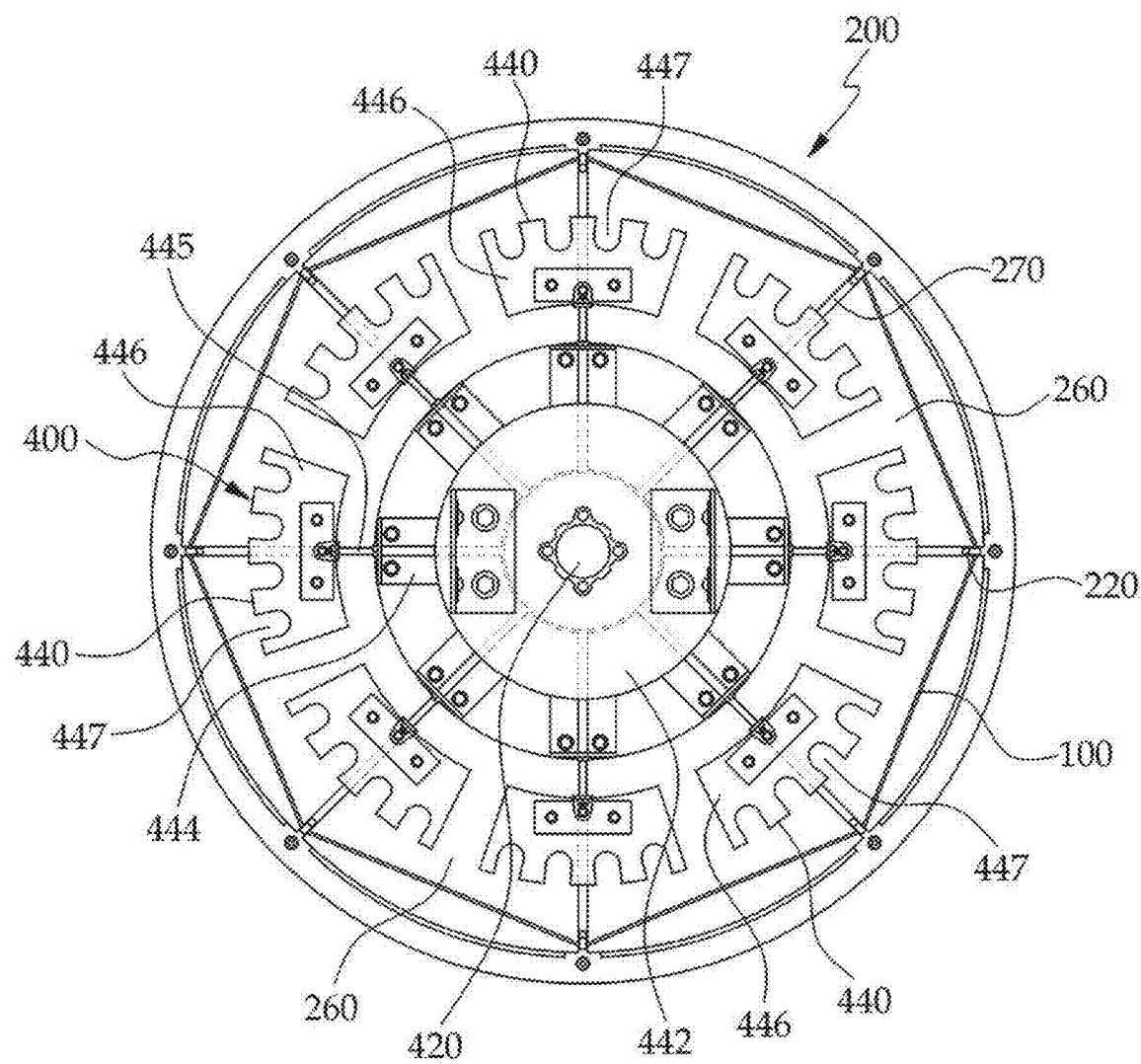

[Fig. 16]
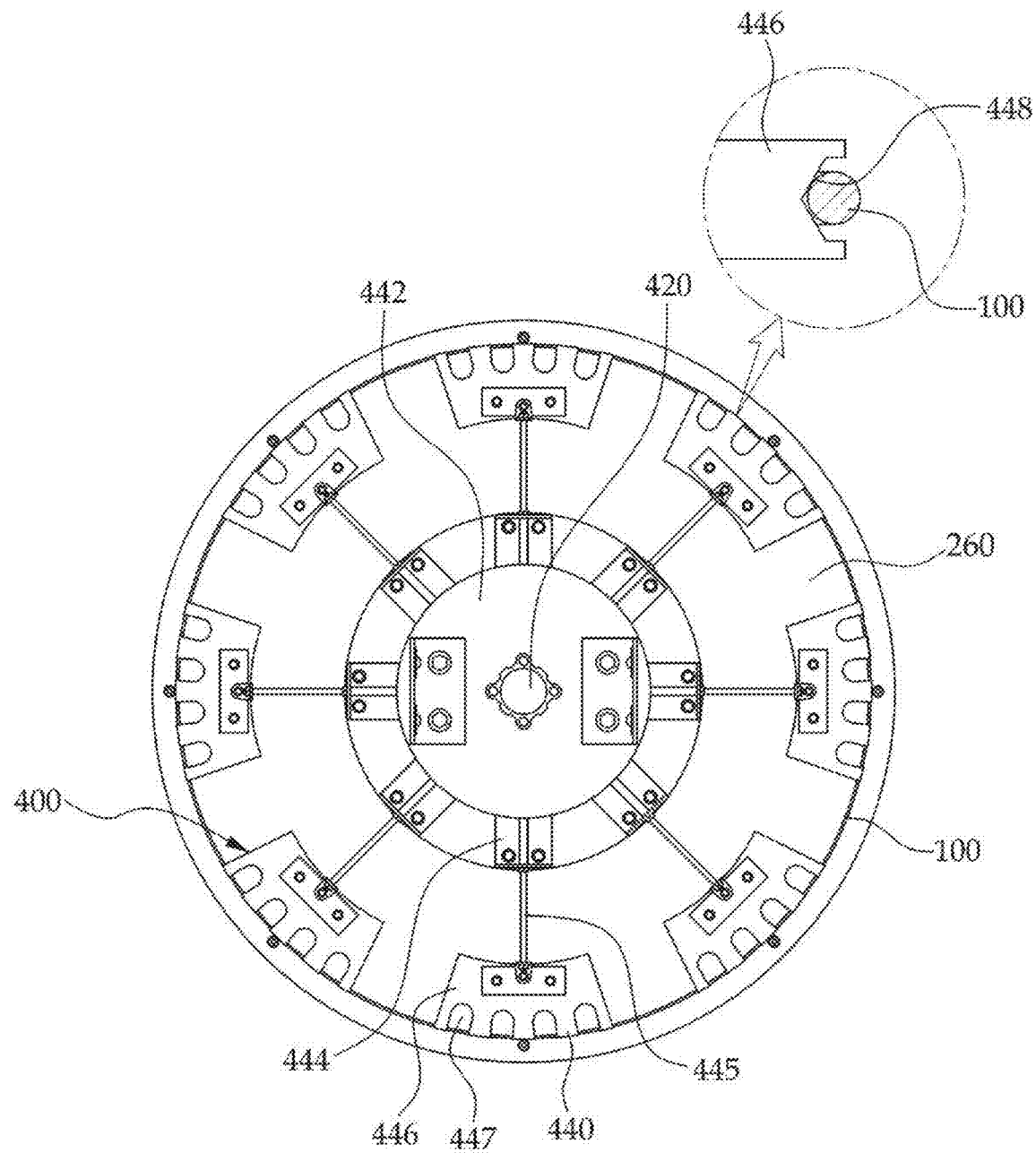

[Fig. 17]
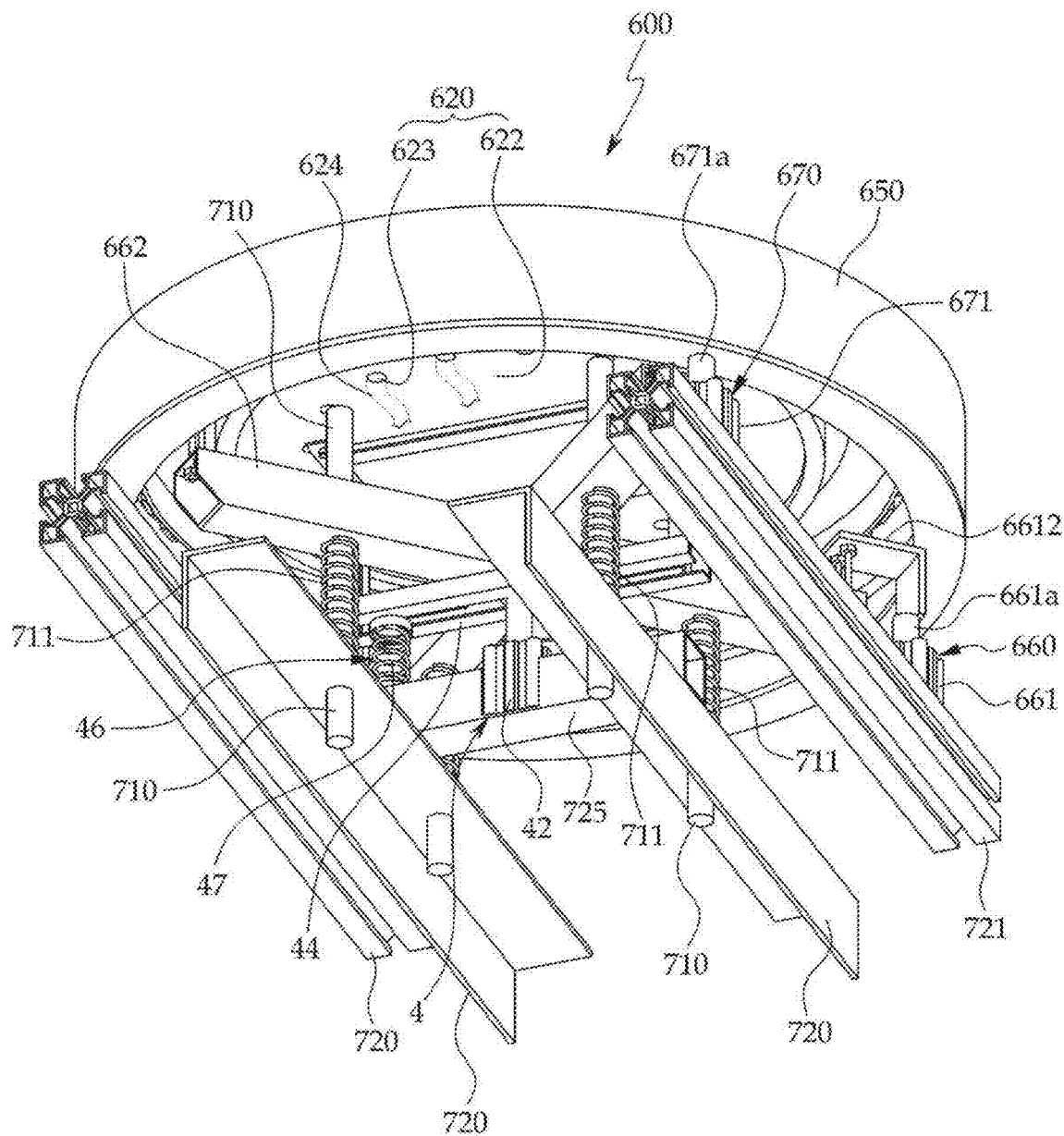

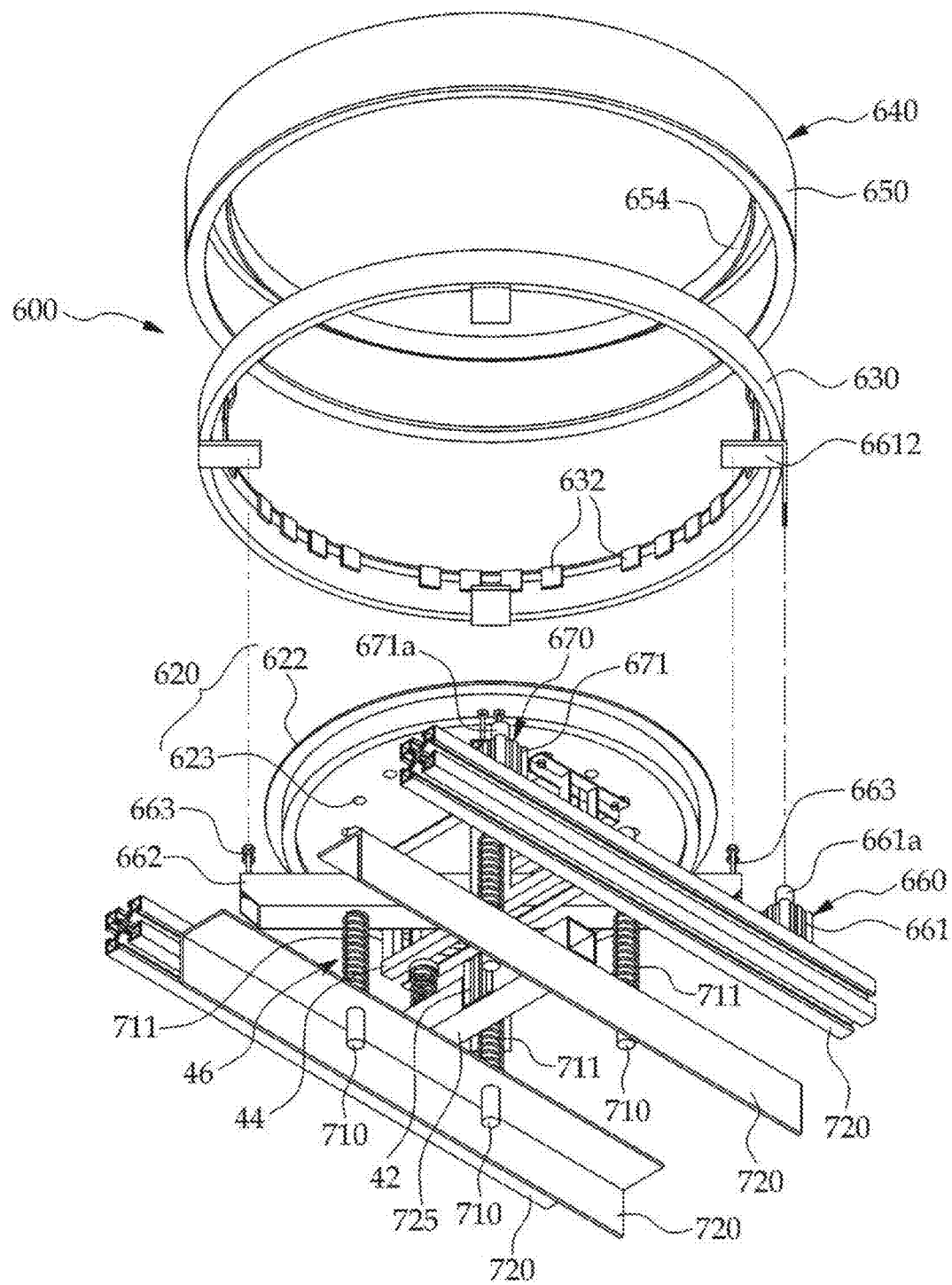
[Fig. 18]

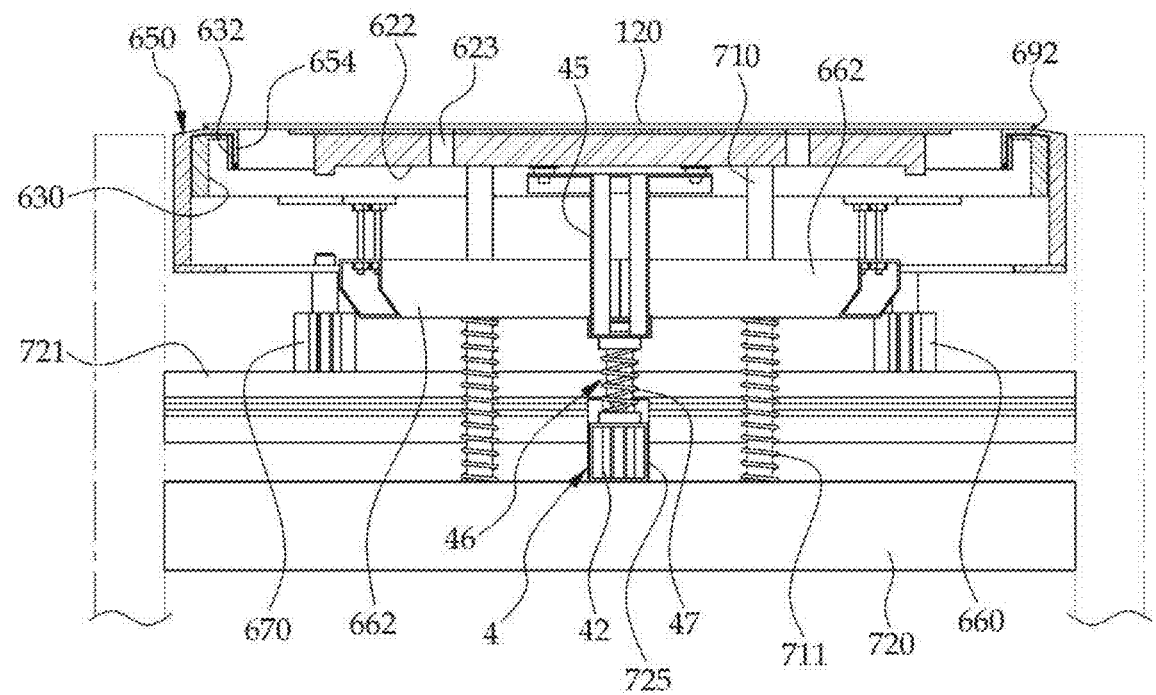
[Fig. 19]

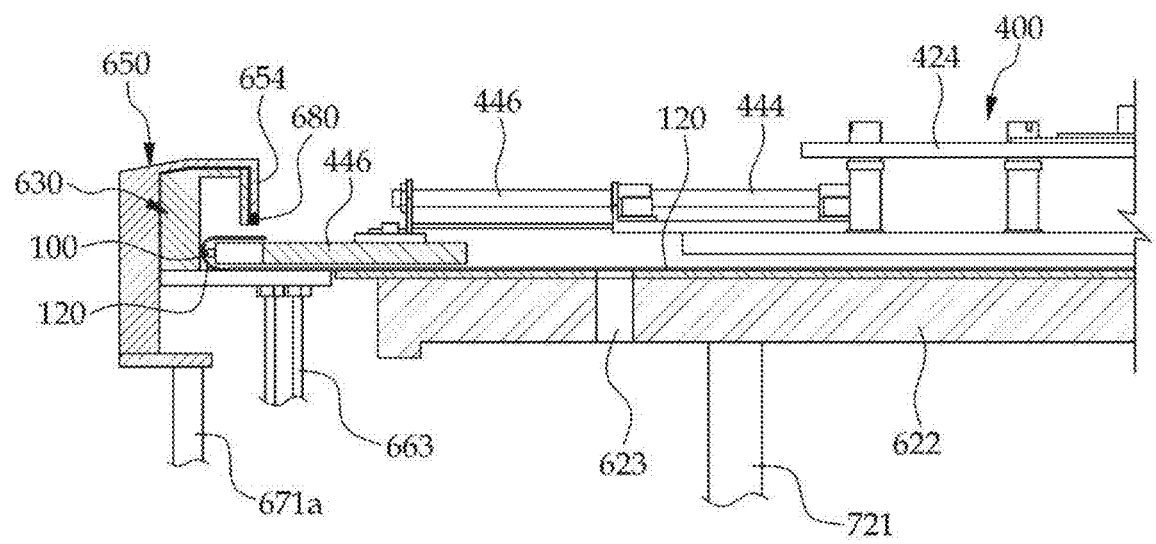
[Fig. 20]

[Fig. 21]
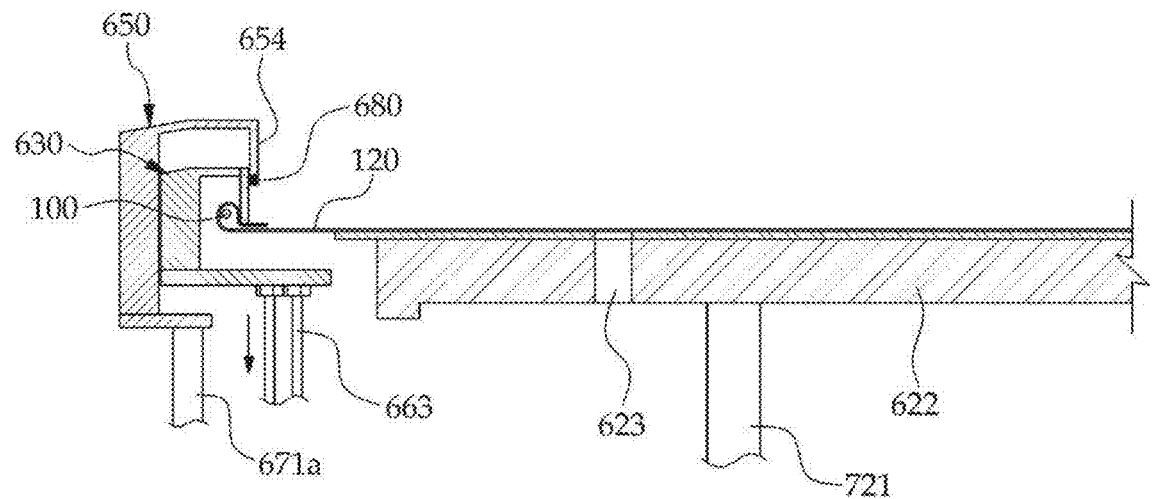
[Fig. 22]
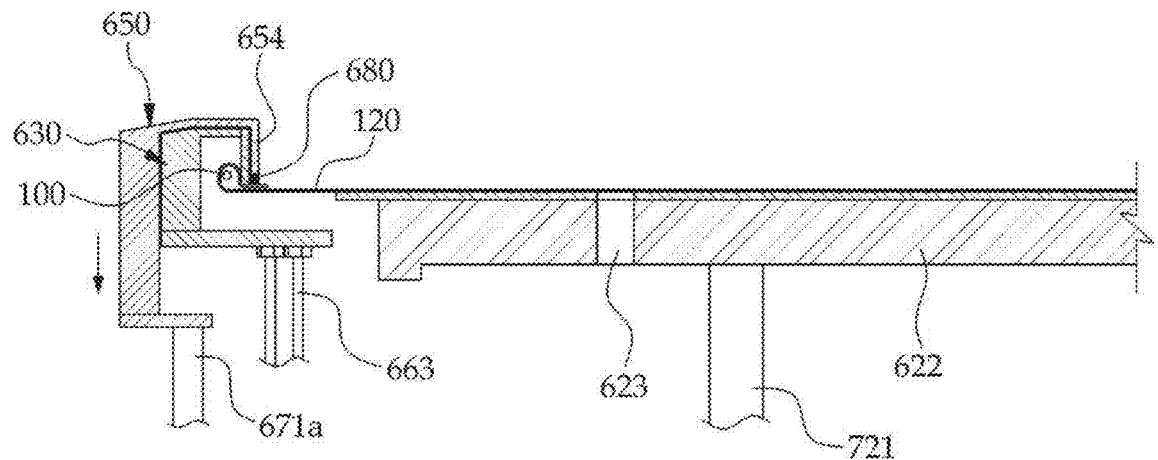

[Fig. 23]
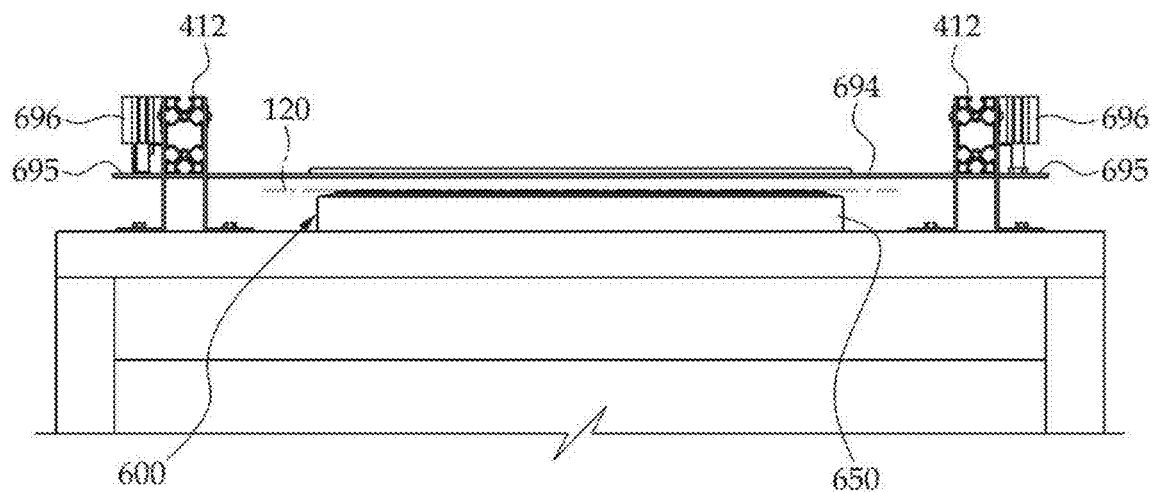

[Fig. 24]
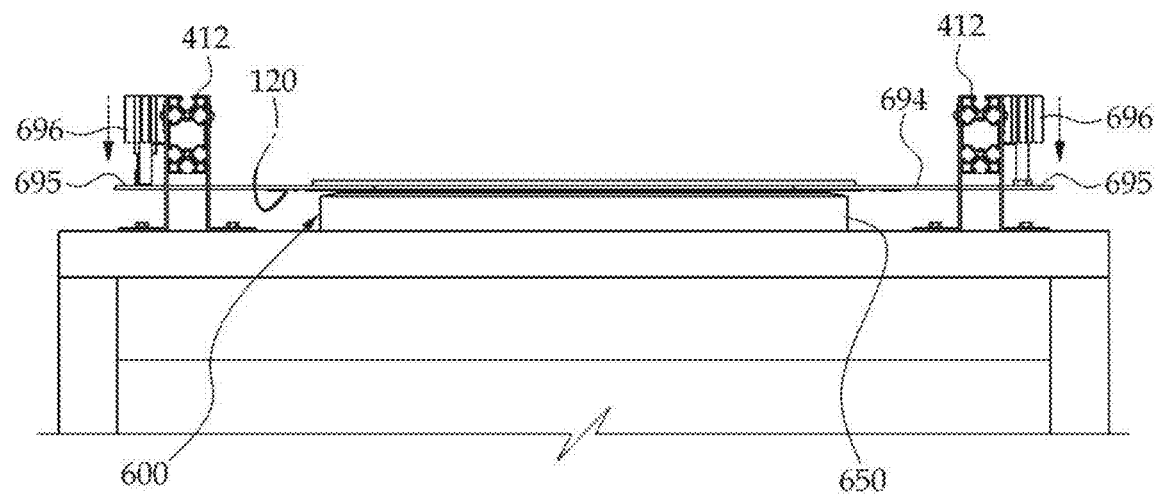

[Fig. 25]
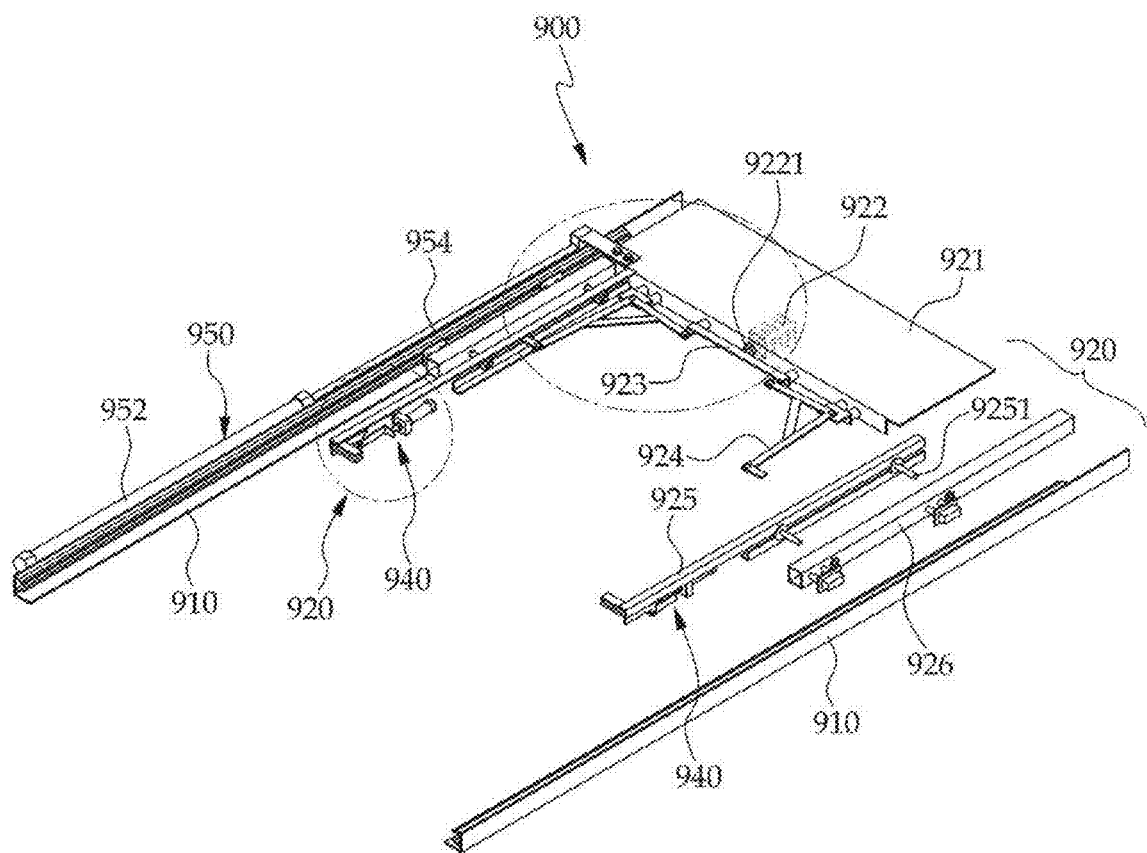

[Fig. 26]
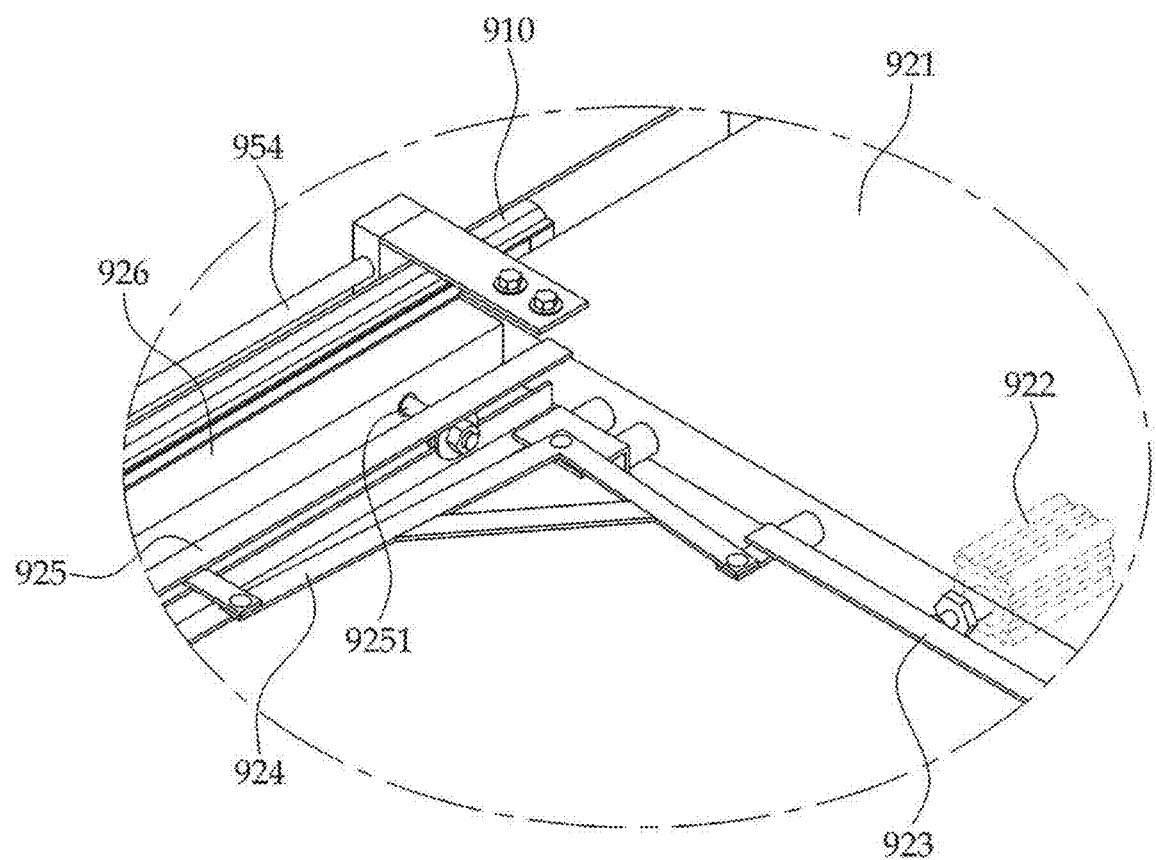

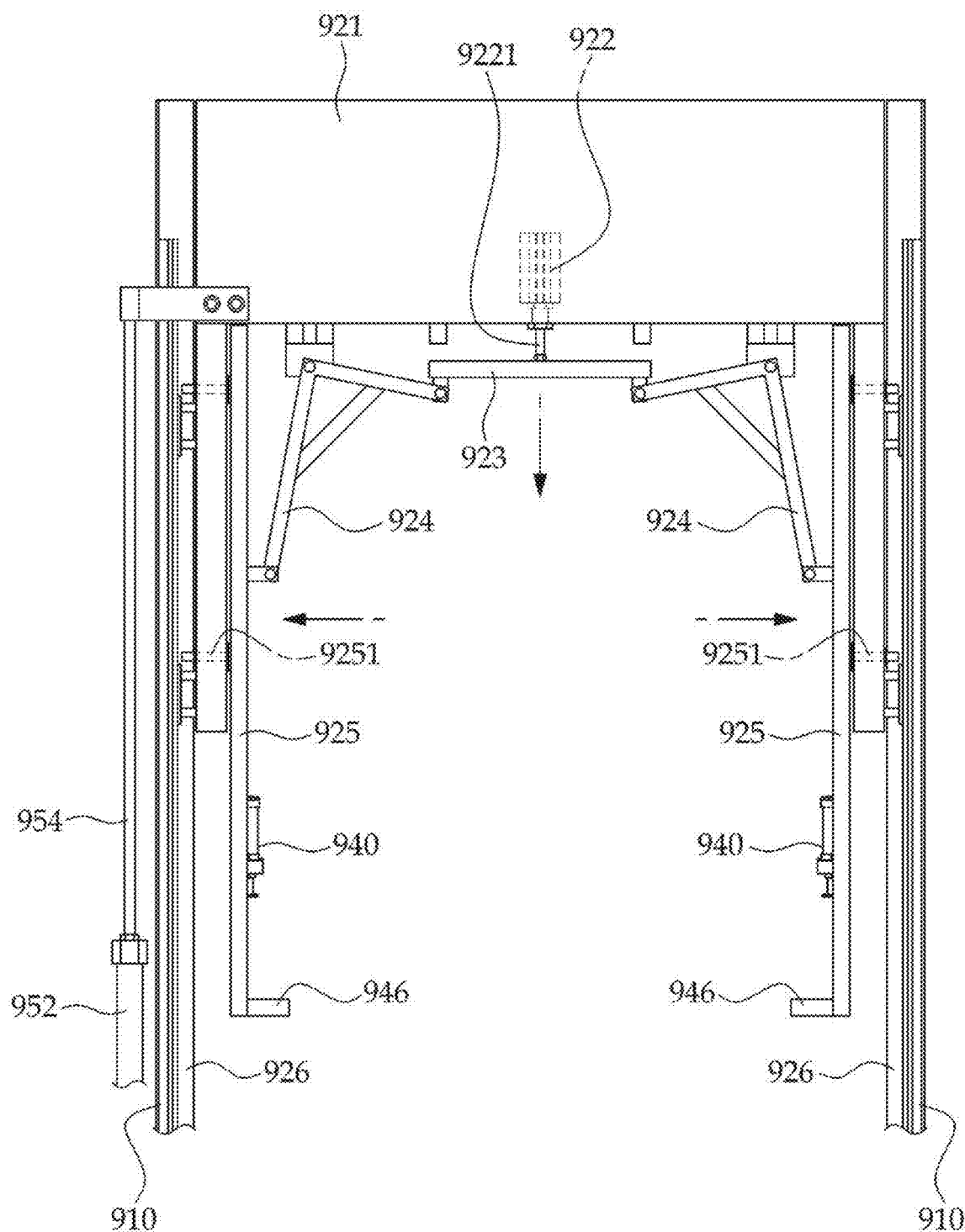
[Fig. 27]

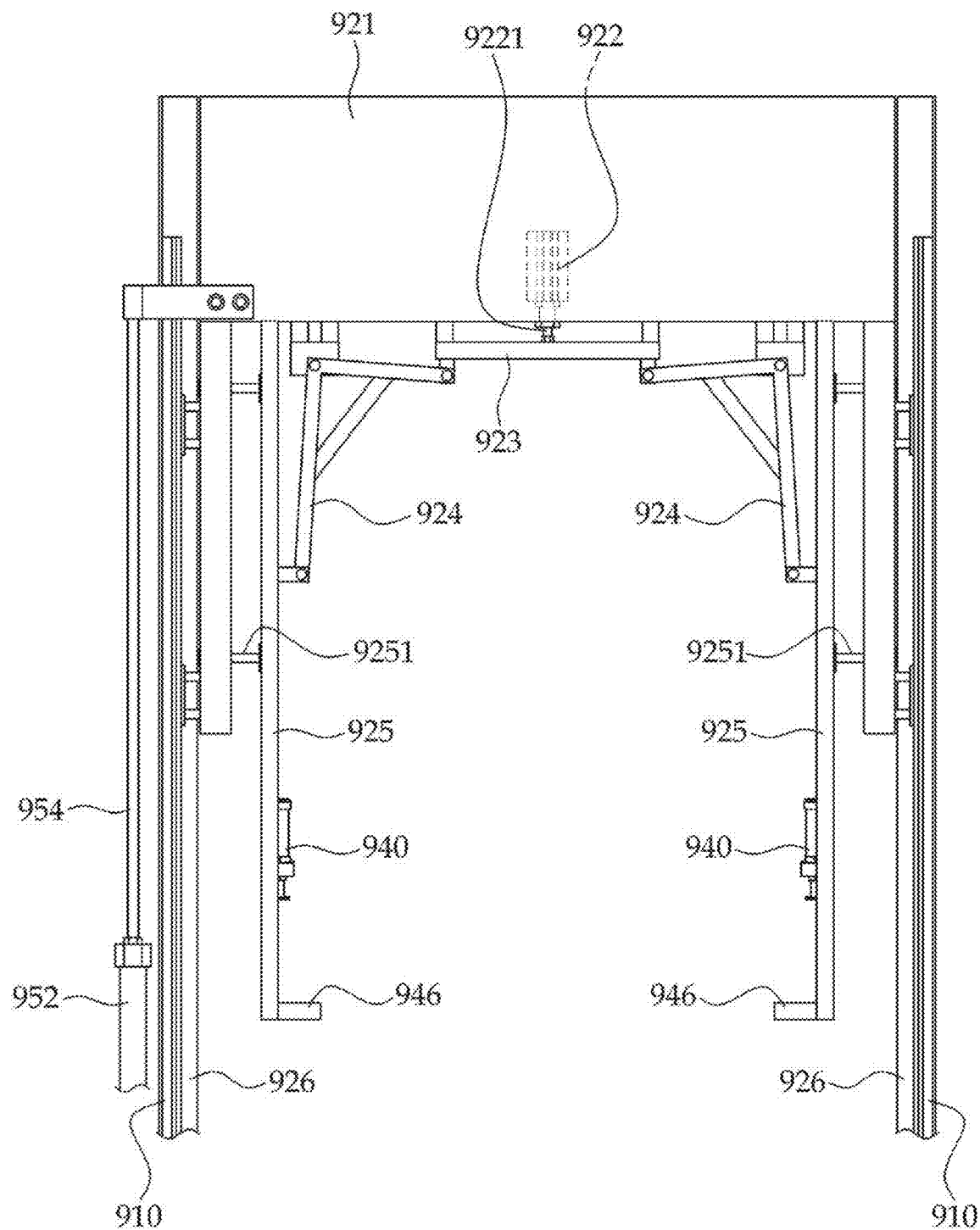
[Fig. 28]

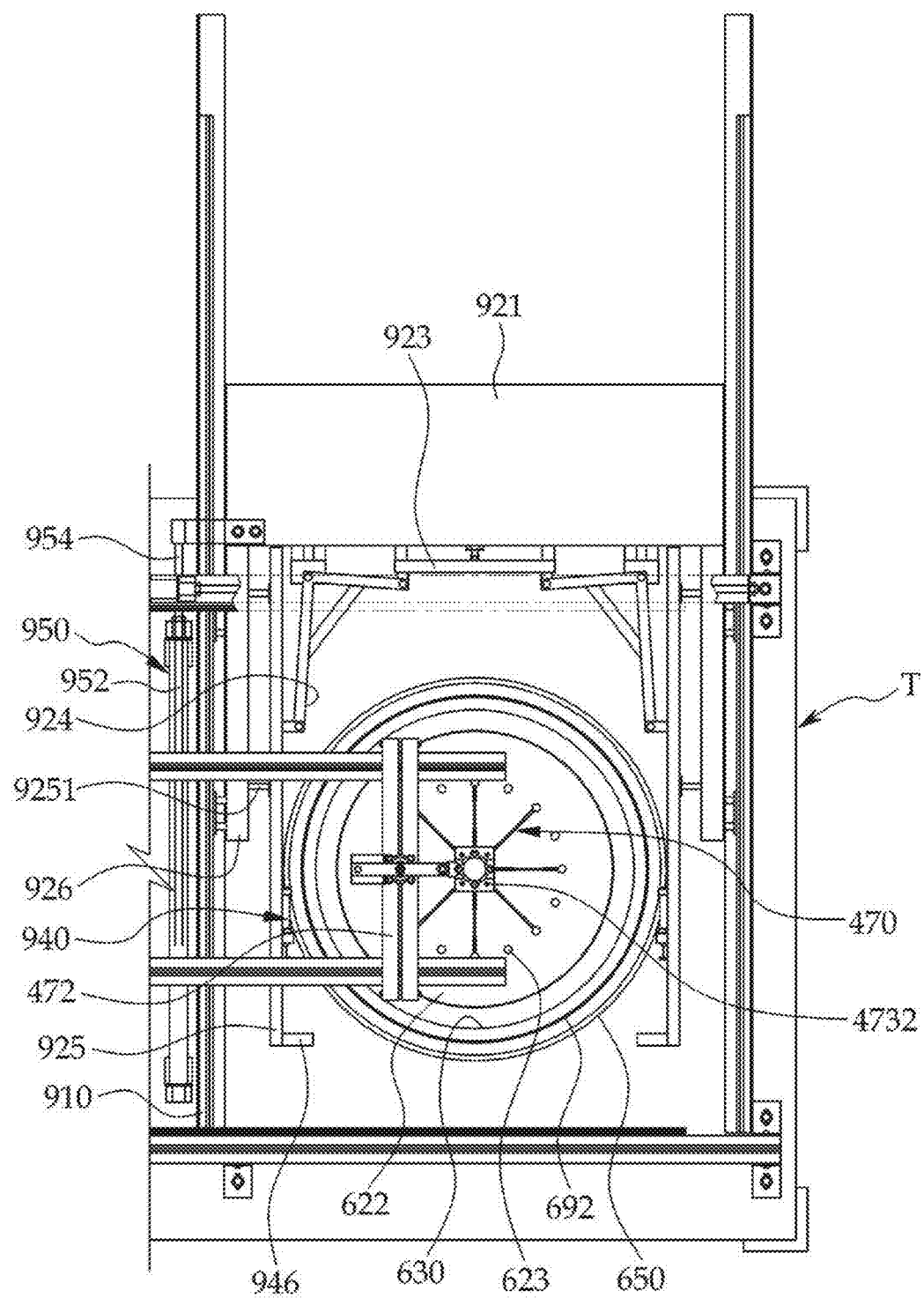
[Fig. 29]

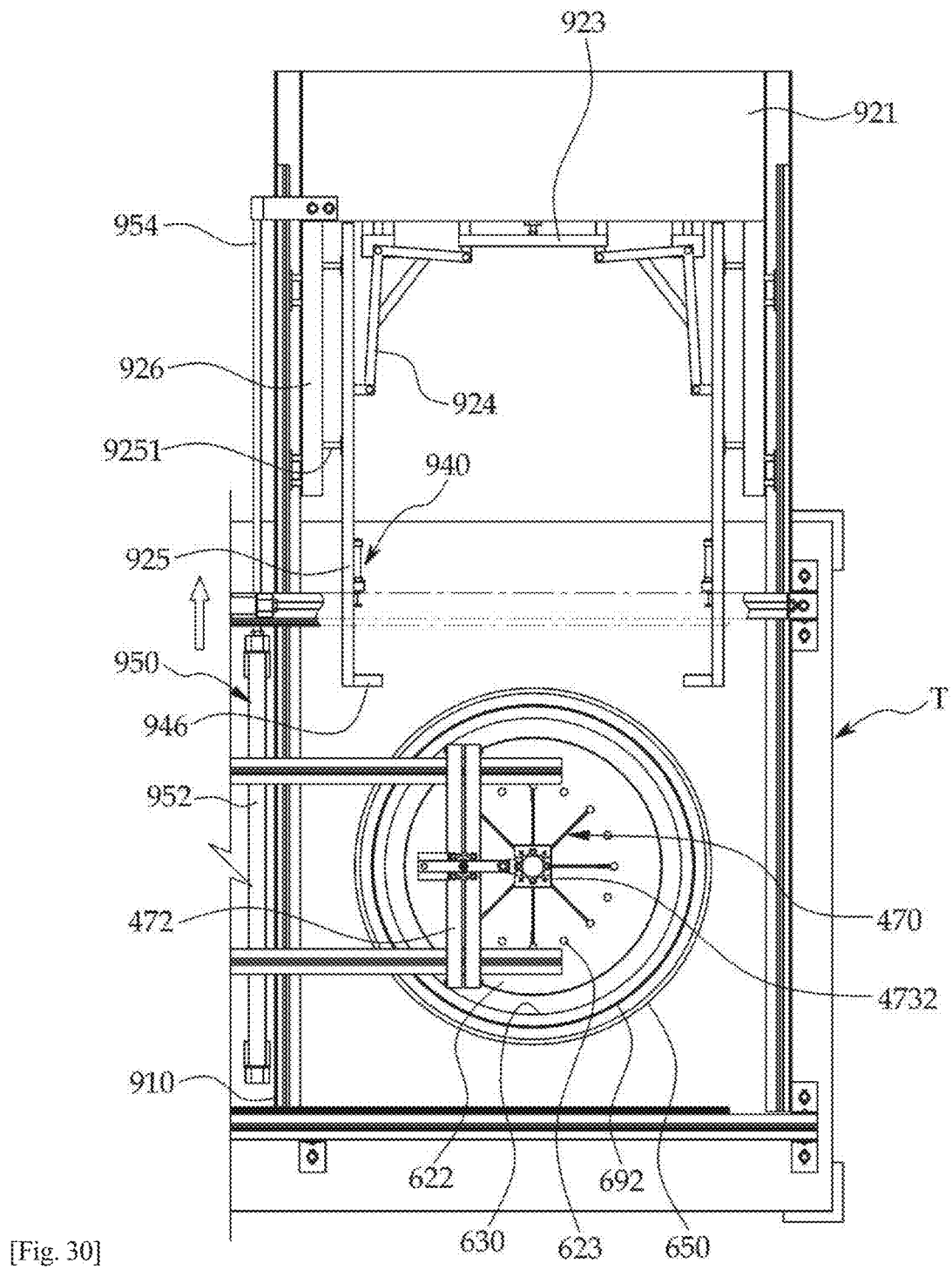
[Fig. 30]

[Fig. 31]
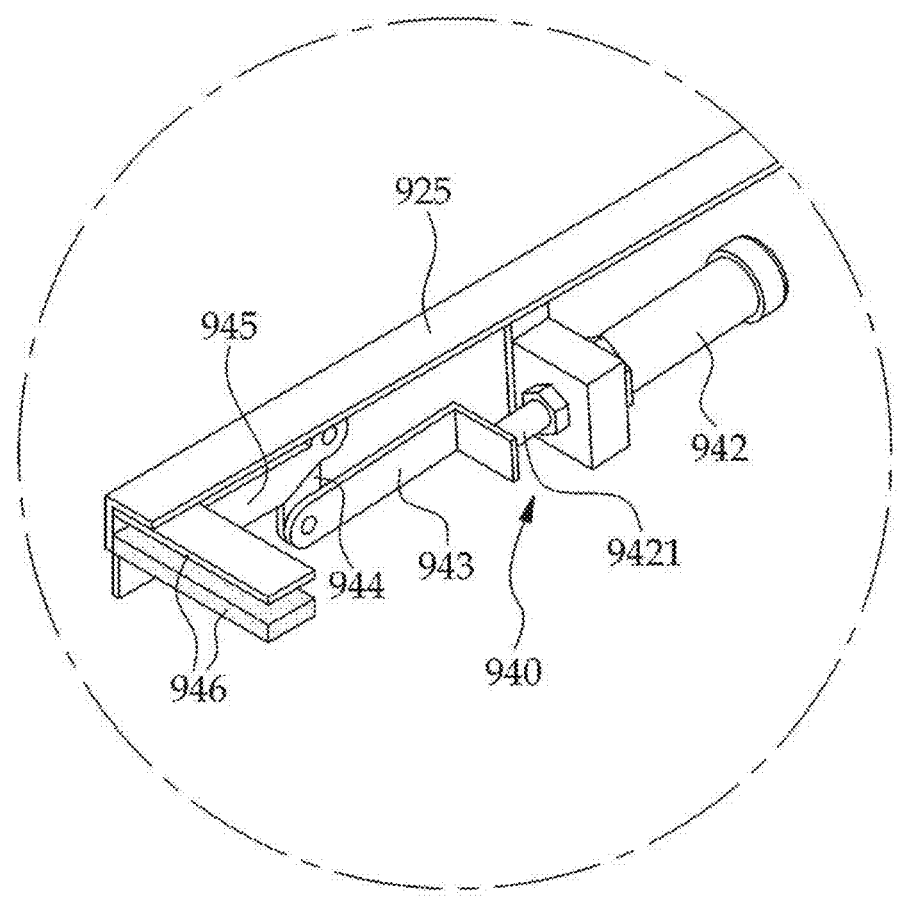

[Fig. 32]
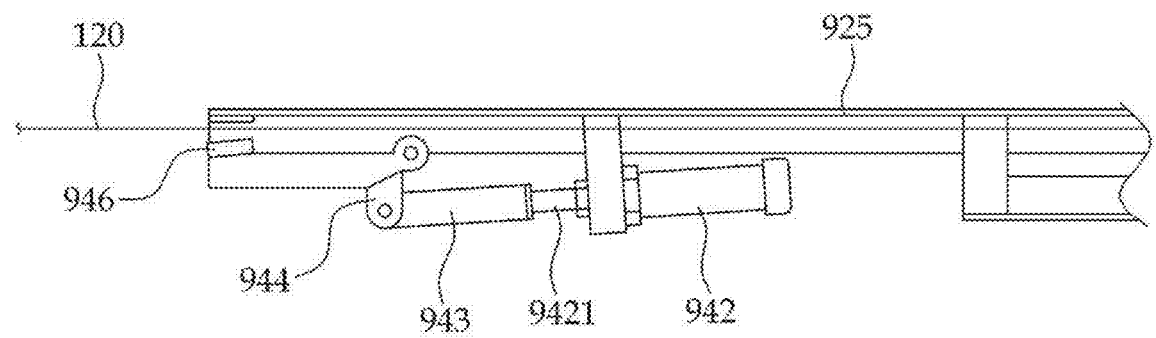
[Fig. 33]
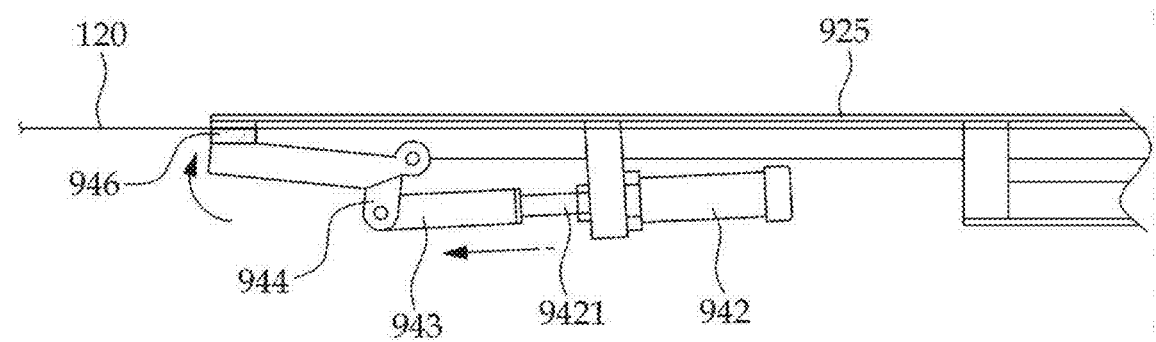

[Fig. 34]
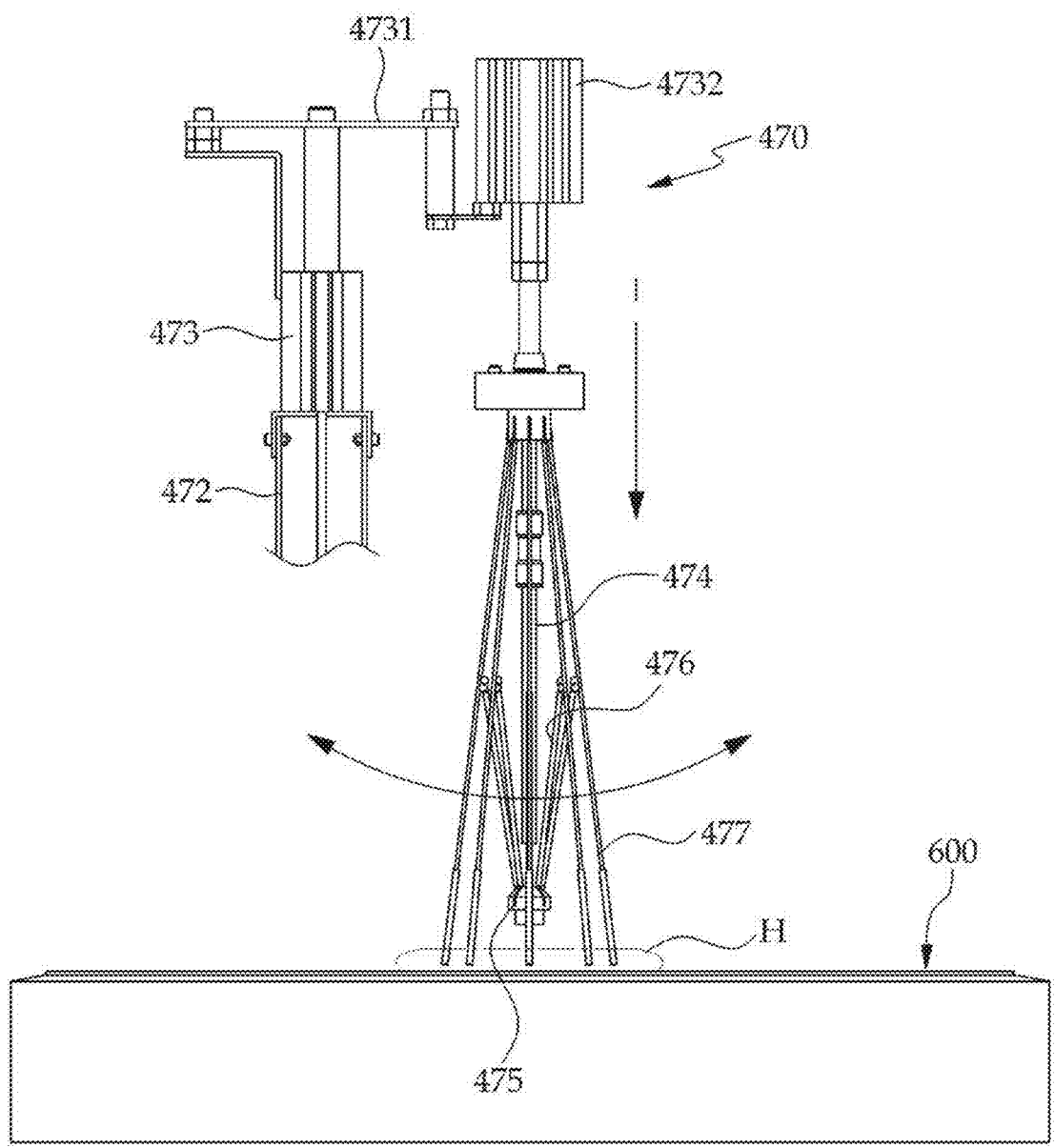

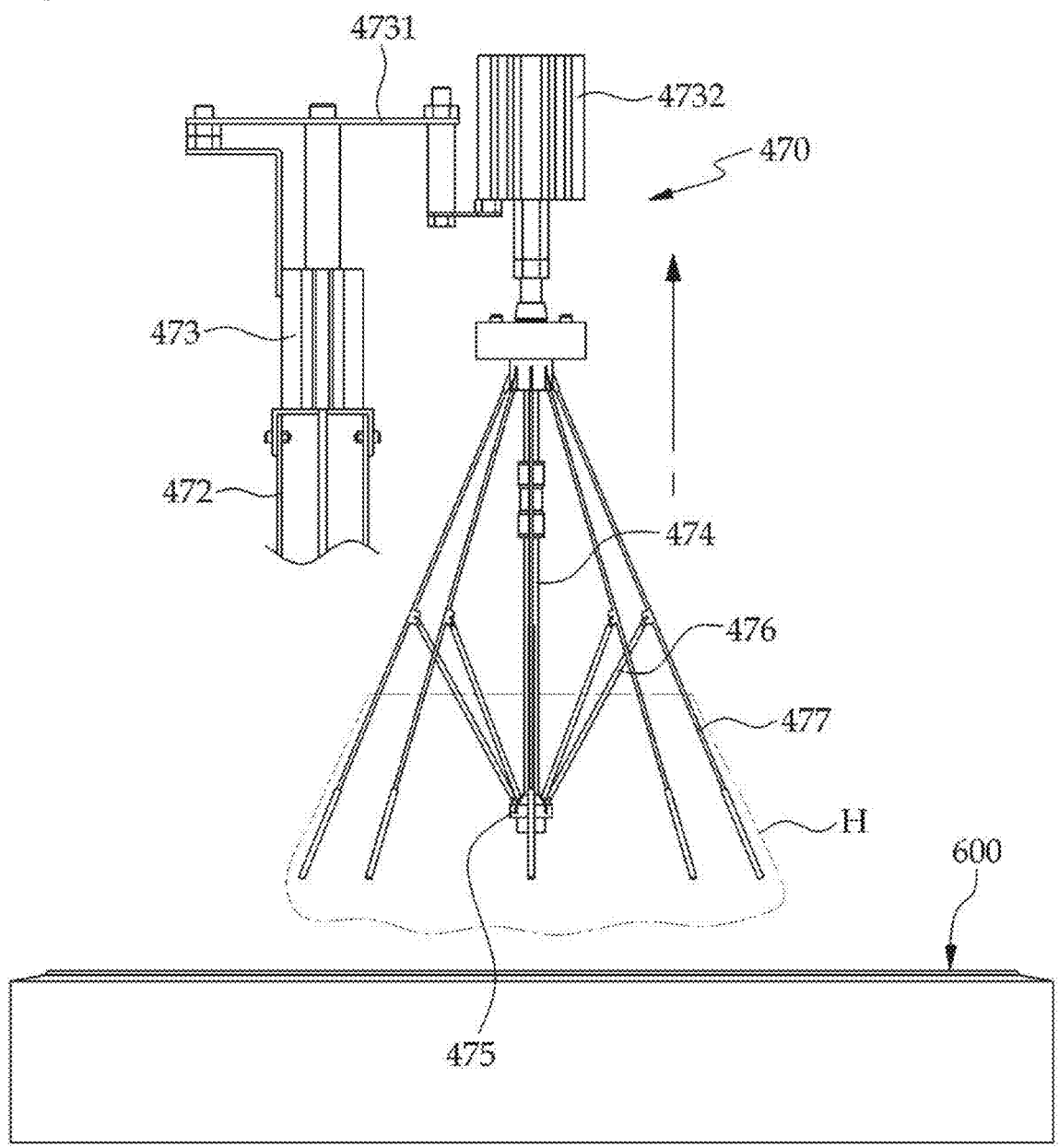
[Fig. 35]

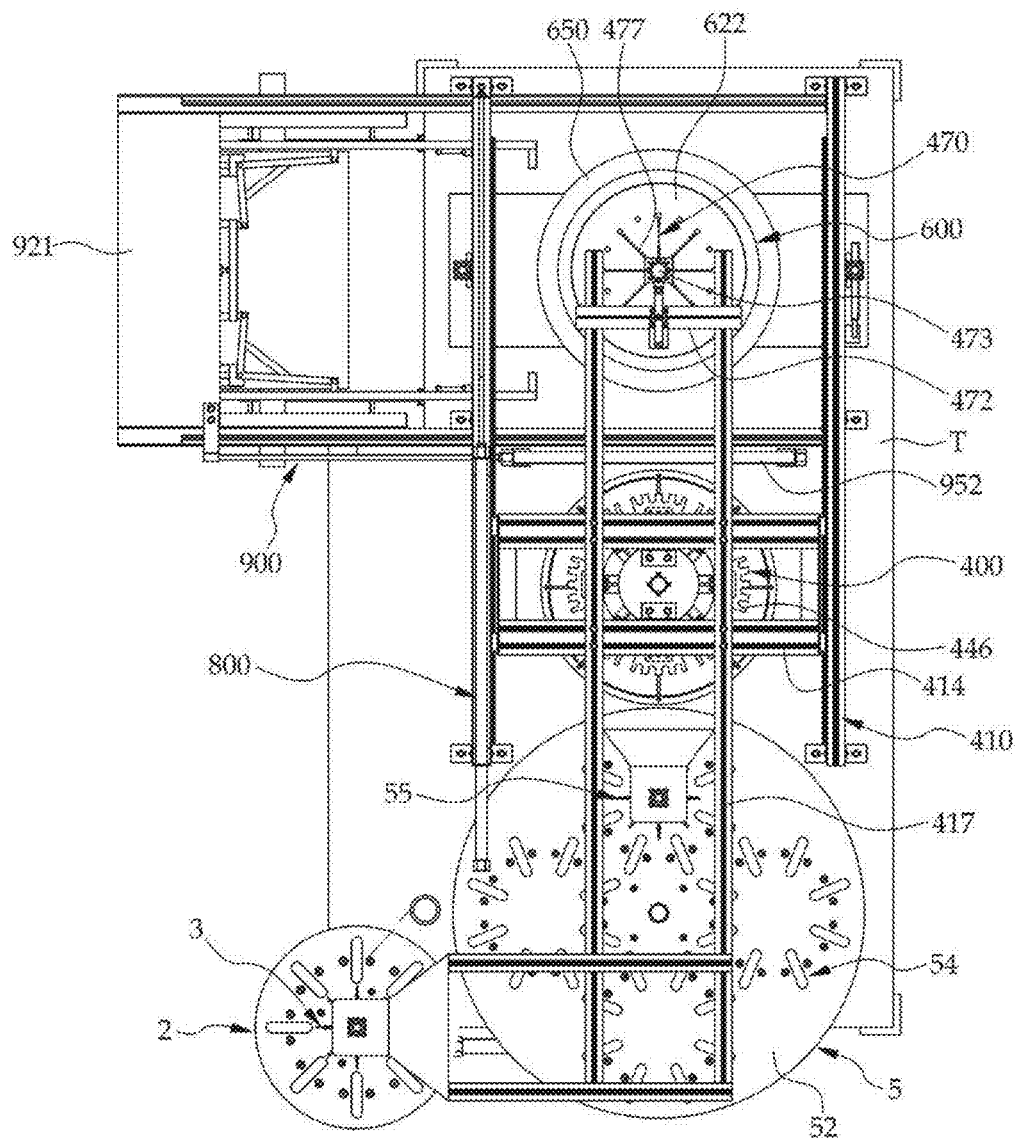
[Fig. 36]

US 11,737,505 B2

APPARATUS FOR MANUFACTURING HAIR CAP

CROSS-REFERENCE TO RELATED APPLICATION

This Application is a Section 371 National Stage Application of International Application No. PCT/KR2019/009853, filed Aug. 7, 2019, which claims priority to KR patent application Serial No. 10-2018-0107745 filed Sep. 10, 2018, and KR patent application Serial No. 10-2019-0084524, filed Jul. 12, 2019, the content of which is hereby incorporated by reference in their entireties.

TECHNICAL FIELD

The present disclosure relates to an apparatus for manufacturing a hair cap and, more particularly, to an apparatus for manufacturing a hair cap made of a nonwoven fabric material and that may be worn on the head in hospitals, restaurants, and houses so as to maintain a hygienic state.

BACKGROUND ART

Unless explicitly described to the contrary in this specification, the information disclosed in this section should not be taken as an acknowledgment or as any form of suggestion that this information forms a prior art of appended claims of this application.

Medical staff in hospitals and cuisine staff in restaurants wear hair caps for clean hygiene.

In addition, persons wear hair caps on the heads for treatments, such as hair dyeing or perms, at home.

A hair cap is made of a film, a nonwoven fabric, or the like by inserting an expanded rubber band into a circular peripheral portion and sewing the circular peripheral portion. When the circular peripheral portion is sewn, the rubber band is contracted to restore the circular shape.

However, a process of manufacturing a hair cap of the related art relies on manual work. That is, a worker manufactured a finished product by sewing the periphery of a circular nonwoven fabric while inserting a rubber band thereinto. This method has problems, such as low working efficiency and the burden of labor cost.

DISCLOSURE

Technical Problem

Accordingly, an objective of the present disclosure is to provide an apparatus for manufacturing a hair cap, the apparatus being able to automatically and sequentially perform operations of preparing a nonwoven fabric, inserting a rubber band into an outer circumferential portion of the nonwoven fabric, and bonding the peripheral portion, thereby improving the efficiency of production.

Technical Solution

An objective of embodiments may be realized by an apparatus for manufacturing a hair cap. The apparatus includes: a worktable; a rubber band mounting unit provided on a portion of the top surface of the worktable such that a rubber band is seated thereon and is expanded; a rubber band conveying unit provided on the top surface of the worktable to hold the expanded rubber band; a nonwoven fabric fusion unit provided on the other side of the top surface of the worktable and joining the rubber band, conveyed by the rubber band conveying unit, after the nonwoven fabric is seated; and a drive unit driving the rubber band conveying unit so as to reciprocate between the rubber band mounting unit and the nonwoven fabric fusion unit.

Advantageous Effects

According to disclosed embodiments, operations of inserting a rubber band into an outer circumferential portion of a nonwoven fabric and bonding the outer circumferential portion are sequentially and rapidly performed, so that the efficiency of production may be significantly improved by automated processing.

DESCRIPTION OF DRAWINGS

FIG. 1 is a perspective view illustrating an apparatus for manufacturing a hair cap according to an embodiment;

FIG. 2 is a plan view illustrating the apparatus for manufacturing a hair cap according to an embodiment;

FIG. 3 is a front view of the "rubber band forming unit" in the apparatus for manufacturing a hair cap according to an embodiment;

FIGS. 4 and 5 are plan views of the "rubber band forming unit" in the apparatus for manufacturing a hair cap according to an embodiment;

FIGS. 6 to 9 are front views sequentially illustrating operations of the "rubber band forming unit" in the apparatus for manufacturing a hair cap according to an embodiment;

FIG. 10 is an exploded perspective view of the "rubber band mounting unit" of the apparatus for manufacturing a hair cap according to an embodiment;

FIG. 11 is an assembled bottom perspective view of the "rubber band mounting unit" of the apparatus for manufacturing a hair cap according to an embodiment;

FIG. 12 is a cross-sectional view of the "rubber band mounting unit" of the apparatus for manufacturing a hair cap according to an embodiment;

FIGS. 13 to 16 are plan views sequentially illustrating operations of the rubber band mounting unit and the rubber band conveyor, FIG. 17 is a bottom perspective view of the "nonwoven fabric fusion unit" of the apparatus for manufacturing a hair cap according to an embodiment;

FIG. 18 is an exploded perspective view of the "nonwoven fabric fusion unit" of the apparatus for manufacturing a hair cap according to an embodiment;

FIG. 19 is an assembled cross-sectional view of the "nonwoven fabric fusion unit" of the apparatus for manufacturing a hair cap according to an embodiment;

FIG. 20 is a cross-sectional view illustrating a state in which the support of the rubber band conveying unit of the nonwoven fabric fusion unit is inserted into the holder unit of the nonwoven fabric fusion unit;

FIG. 21 is a view illustrating the support of the rubber band conveying unit of the "nonwoven fabric fusion unit" being held by the holder unit of the nonwoven fabric fusion unit;

FIG. 22 is a view illustrating a state in which a bonding operation is performed by the holder unit at the same time that the support of the rubber band conveying unit of the "nonwoven fabric fusion unit" is contracted;

FIG. 23 is a front view illustrating a state in which the pressing plate of the "nonwoven fabric fusion unit" has been moved upward;

FIG. 24 is a front view illustrating a state in which the pressing plate of the "nonwoven fabric fusion unit" has been moved downward;

FIG. 25 is an exploded perspective view of the "nonwoven fabric supply section" of the apparatus for manufacturing a hair cap according to an embodiment;

FIG. 26 is an exploded perspective view of the supply unit of the nonwoven fabric supply section;

FIGS. 27 and 28 are plan views sequentially illustrating a distance adjustment operation of the supply unit;

FIGS. 29 and 30 are plan views illustrating forward and backward operations of the supply unit;

FIG. 31 is an exploded perspective view of the holder unit of the nonwoven fabric supply section;

FIGS. 32 and 33 are plan views sequentially illustrating a distance adjustment operation of the supply unit;

FIG. 34 is a front view illustrating a downward movement of the contracted "collecting unit" in the apparatus for manufacturing a hair cap according to an embodiment;

FIG. 35 is a front view illustrating a holding operation of the "collecting unit" after having moved downward in the apparatus for manufacturing a hair cap according to an embodiment; and FIG. 36 is a plan view illustrating an apparatus for manufacturing a hair cap according to another embodiment.

MODE FOR INVENTION

Hereinafter, exemplary embodiments will be described in detail with reference to the accompanying drawings.

The embodiments to be described in detail hereinafter are provided for illustrative purposes to fully convey the concept of the present disclosure to those skilled in the art so that those skilled in the art could easily put the present disclosure into practice. However, it should not be understood that the spirit and scope of the present disclosure are limited thereby.

In addition, the sizes or thicknesses of components illustrated in the drawings may be exaggerated for clarity and convenience of explanation. In addition, terms specially defined in consideration of the configurations and functions of the present disclosure may vary depending on the intentions of users or operators or practices. Therefore, the terms shall be defined on the basis of the description throughout the specification.

FIG. 1 is a perspective view illustrating an apparatus for manufacturing a hair cap according to an embodiment, and FIG. 2 is a plan view illustrating the apparatus for manufacturing a hair cap according to an embodiment.

As illustrated in FIGS. 1 and 2, the apparatus for manufacturing a hair cap according to an embodiment includes:

a worktable T;

a rubber band forming unit 2 provided on one end portion of the worktable T, wherein the rubber band forming unit 2 forms a circular rubber band 100, increases the diameter of the rubber band 100 to an appropriate size, and supplies the diameter-increased rubber band 100 to a rubber band mounting unit 200;

the rubber band mounting unit 200 outwardly expanding the rubber band 100 supplied by the rubber band forming unit 2 so as to increase the diameter of the rubber band 100;

a rubber band conveying unit 400 provided on the top surface of the worktable T, wherein the rubber band conveying unit 400 conveys the entirety of the diameter-increased rubber band 100 to one side by holding the rubber band 100;

a nonwoven fabric fusion unit 600 provided on the top surface of the other end portion of the worktable T, wherein the nonwoven fabric fusion unit 600 joins the rubber band 100, conveyed by the rubber band conveying unit 400, to an outer circumferential portion of a nonwoven fabric 120 after the nonwoven fabric 120 is seated;

a drive unit 800 driving the rubber band conveying unit 400 so as to reciprocate between the rubber band mounting unit 200 and the nonwoven fabric fusion unit 600.

A nonwoven fabric supply section 900 supplying a nonwoven fabric to the nonwoven fabric fusion unit 600 and a hair cap collecting unit 1000 collecting a hair cap H manufactured by the nonwoven fabric fusion unit 600 are provided on one portion of the worktable T.

FIG. 3 is a front view of the "rubber band forming unit" in the apparatus for manufacturing a hair cap according to an embodiment, FIGS. 4 and 5 are plan views of the "rubber band forming unit" in the apparatus for manufacturing a hair cap according to an embodiment, and FIGS. 6 to 9 are front views sequentially illustrating operations of the "rubber band forming unit" in the apparatus for manufacturing a hair cap according to an embodiment.

The rubber band forming unit 2 includes:

a turntable 22 rotatably mounted on the top plate of the worktable T via a bearing and having a plurality of rollers 21 provided on the top surface thereof in the circumferential direction;

a bobbin 23 provided at one side on top of the turntable 22 to supply the rubber band 100 so as to be wound on a plurality of rollers 21;

a rotary shaft 24 coupled to the bottom of the central portion of the turntable 22; a drive unit 10 rotating the rotary shaft 24;

a cutter (not shown) provided at the other side on top of the turntable 22 to cut one end of the circular rubber band 100 after the turntable 22 is rotated once by the power of the drive unit 10;

a bonding device (not shown) provided on one side of the cutter to bond both ends of the rubber band 100 after a cutting operation; and a rubber band conveyor 3 removing the rubber band 100 from the plurality of rollers 21 and conveying the rubber band 100 to the rubber band mounting unit 200.

The drive unit 10 includes a pinion gear 25 mounted on the rotary shaft 24 and a pneumatic cylinder 102 including a gear rod 101 having a rack gear 103 engaged with the pinion gear 25. The pneumatic cylinder 102 controls protruding and retracting actions of the gear rod 101 using air pressure as a power source.

Thus, when the gear rod 101 is protruded, the rack gear 103 is linearly moved so as to rotate the pinion gear 25, thereby rotating the turntable 22 once.

Due to the plurality of rollers 21 being arrayed in the outer circumferential direction during the single rotation of the turntable 22, the rubber band 100 is formed to have a circular shape.

Here, one end of the rubber band 100 is temporarily fixed to one of the plurality of rollers 21. Along with the rotation of the turntable 22, the rubber band 100 is formed into a circular shape while being removed from the bobbin 23. Afterwards, the cutter (not shown) cuts the other end of the rubber band 100.

The rubber band 100, cut by the cutter, is disposed so that both ends thereof are in contact with each other. Then, an adhesive is applied to the both ends using a bonding device (not shown), thereby bonding the both ends together. Accordingly, the circular rubber band 100 is completed.

The completed circular rubber band 100 remains wound on the plurality of rollers 21 of the turntable 22.

The rubber band conveyor 3 includes:

a first cylinder 33 vertically provided above the turntable 22, having a rod movable up and down, and mounted on top of a bracket 31 mounted on a frame; a second cylinder 32 mounted on the rod of the first cylinder 33, provided below the bracket, and having a rod movable up and down; and a holder unit H including a plurality of first and second link pieces 35 and 36 hinge-coupled to the rod of the second cylinder 32.

The second cylinder 32 and the holder unit H are moved up and down by the upward and downward movement of the first cylinder 33, thereby enabling height adjustment.

Afterwards, as the plurality of first and second link pieces 35 and 36 are spread in concert with the downward movement of the rod of the second cylinder 32, the holder unit H holds the rubber band 100.

A first fixing plate 37 is coupled to the rod of the second cylinder 32.

In addition, each of the plurality of first link pieces 35 extends upward at an incline, with one end thereof being hinge-coupled to the first fixing plate 37. Each of the plurality of second link pieces 36 extends substantially vertically, with the corresponding first link piece 35 being hinge-coupled to intermediate portion thereof, and the top ends thereof being hinge-coupled to a second fixing plate 36.

A plurality of insert holes 221 is radially formed in the turntable 22 so as to extend therethrough. The insert holes 221 have the shape of elongated ellipses, and the second link pieces 36 are inserted into the insert holes 221, respectively. The insert holes 221 extend in length so as to enable an operation of spreading the second link pieces 36 outward.

Next, FIGS. 5 to 8 are views sequentially illustrating operations of the rubber band conveyor 3.

As illustrated in FIG. 5, the rubber band 100 is formed to have a circular shape due to the plurality of rollers 21 provided on the turntable 22.

As illustrated in FIG. 6, the plurality of second link pieces 36 are inserted into corresponding insert holes of the plurality of insert holes 221, respectively, thereby reaching more-deeply lowered positions inside the rubber band 100 wound on the plurality of rollers 222.

Afterwards, as illustrated in FIGS. 7 and 8, the plurality of second link pieces 36 is spread, thereby catching and expanding the rubber band 100 wound on the plurality of rollers 222. In addition, the plurality of second link pieces 36 removes the rubber band 100 while moving upward.

In a state in which the rubber band 100 is wound in this manner, the rubber band conveyor 3 moves in response to the linear movement of the rubber band conveying unit 400 so as to be located above the rubber band conveying unit 400 and the rubber band mounting unit 200.

After the rubber band conveyor 3 is arrayed on top of the rubber band conveying unit 400, in a state in which the second link pieces 36 are spread to the maximum extent so that the rubber band 100 is expanded to a circle greater than the circle of a plurality of supports 446 of rubber band holder units 440, the rubber band conveyor 3 moves downward, thereby locating the rubber band 100 on side surfaces of the plurality of supports 446.

Thereafter, the rubber band conveyor 3 may be contracted so as to bring the rubber band 100 into close contact with the outer circumferential portions of the plurality of supports 446.

The rubber band conveyor 3, from which the rubber band 100 is detached, moves upward to the contracted position and then returns to the original position. That is, the rubber band conveyor 3 is located above the turntable 22 of the rubber band forming unit 2.

On the other hand, FIG. 36 is a plan view illustrating an apparatus for manufacturing a hair cap according to another embodiment.

A storage 5 able to store and cure a plurality of rubber bands is further provided on one side of the turntable 22.

The storage 5 includes a mounting turntable 52 rotatably mounted on the top plate of the worktable T.

In addition, a plurality of rubber band mounts 54 is provided on the mounting turntable 52.

In addition, provided is a rubber band conveyor 3 removing the rubber band 100 from each of the rubber band mounts 54 and conveying the rubber band 100 to the rubber band mounting unit 200.

Four rubber band mounts are provided on the turntable. In each of the rubber band mounts, a plurality of rollers 21 is arrayed.

The rubber band conveyor 3 is provided on each of the rubber band mounts 54.

The rubber band conveyor 3 is substantially the same as the above-described rubber band conveyor 3, and thus, a repetitive description thereof will be omitted.

FIG. 3 is an exploded perspective view of the "rubber band mounting unit" of the apparatus for manufacturing a hair cap according to an embodiment, FIG. 4 is an assembled bottom perspective view of the "rubber band mounting unit" of the apparatus for manufacturing a hair cap according to an embodiment, FIG. 5 is a cross-sectional view of the "rubber band mounting unit" of the apparatus for manufacturing a hair cap according to an embodiment, and FIGS. 6 to 9 are plan views sequentially illustrating operations of the rubber band mounting unit and the rubber band conveyor.

As illustrated in FIGS. 3 and 4, the rubber band mounting unit 200 includes:

a plurality of catching members 220 provided on a circle to increase or reduced distance thereof while moving from the center to the outer circumference;

a catching member operating unit 300 causing the rubber band 100 to be caught by the plurality of catching members 220 and moving each of the catching members 220 to increase the distances thereof, so that the rubber band 100 is expanded; and a pad 260 having a plurality of slits 270 along which the plurality of catching members 220 is movable reciprocally.

The pad 260 is made of an elastic urethane material, and the plurality of slits 270 radially extend from the central portion to the outer circumferential portions.

The catching member operating unit 300 includes:

first and second pinion gears 310 and 320 hinge-coupled to an axis pin provided on the lower central portion of the pad 260 and coupled to both ends of the slits 270, respectively, so as to be rotatable; and belts 330 connecting the first and second pinion gears 310 and 320.

The catching members 220 are mounted on the belts 330, respectively, and a main gear 341 is engaged with the first pinion gears 310.

A power source 340 rotating the main gear 341 is provided.

The power source 340 includes a pneumatic cylinder 344 and a piston rod 343. The piston rod 343 is coupled to the pneumatic cylinder 344 so as to be retracted and protruded thereby.

A rack gear 342 is mounted on the piston rod 343 and is disposed in parallel to the bottom portion of the pad 260.

The rack gear 342 is engaged with the main gear 341.

Thus, when the piston rod 343 is protruded, the rack gear 342 linearly moves, and the main gear 341 engaged with the rack gear 342 rotates.

The belts 330 rotate in concert with the rotation of the main gear 341, so that the catching members 220 move along the slits 270 so as to gather at the center of the pad 260.

Afterwards, when the piston rod 343 is retracted, the belts 330 are rotated in the reverse direction, and the catching members 220 move in the opposite directions along the slits 270 so as to be located at outskirt portions (i.e. outer circumferential portions) of the pad 260, thereby performing a distributing operation.

Accordingly, in a state in which the plurality of catching members 220 has gathered on the central portion of the pad 260, the rubber band 100 is mounted.

Afterwards, the plurality of catching members 220 performs a distributing operation, thereby expanding the rubber band 100.

With reference to FIGS. 1 and 2, the rubber band conveying unit 400 will be described.

The plurality of supports 446 is seated on the top surface of the pad 260. The plurality of supports 446 is disposed in the circumferential direction so as to be expanded and contracted. The plurality of supports 446 is expanded so that the expanded rubber band 100 is mounted thereon by close contact with the outer circumferential portions thereof.

The rubber band conveying unit 400 includes:

a movable table 410 disposed on top of the worktable T, wherein the movable table 410 includes parallel rail bars 412 disposed on both sides to cover the top portions of the rubber band mounting unit 200 and the nonwoven fabric fusion unit 600, each of the rail bars 412 including a rail, and a frame 414 including rollers coupled to the rails of the both rail bars 412 to be movable in a linear direction;

a lift cylinder 420 mounted on the frame 414 of the movable table 410 and including a rod operating to move up and down; and the rubber band holder units 440.

Each of the rubber band holder units 440 includes a fixing plate 442 connected to the rod of the lift cylinder 420, a plurality of cylinder units 444 radially disposed on the top surface of the fixing plate 442 and respectively including a rod 445 operating to protrude and retract in response to changes in pneumatic pressure, and the plurality of supports 446 connected to the rods 445 of the cylinder units 444, respectively.

The rail bars 412 are mounted on a plurality of supports 415 vertically disposed on top of the worktable T so as to be spaced apart from the top portion of the worktable T. Particularly, the rail bars 412 may be located above the band mounting unit 200 and the nonwoven fabric fusion unit 600 so as not to interfere with the frame 414 when the frame 414 moves.

The rollers may be provided on both ends of the frame 414 and be coupled to the rails of the rail bars 412, thereby allowing the frame 414 to be driven in the linear direction.

Crossbars 417 are provided on top of the frame 414 and coupled to the frame 414.

A connecting bar 472 of the collecting unit 470 to be described later is mounted on one side of the crossbars 417.

As the lift cylinder 420 is operated to move up and down, the height of the rubber band holder units 440 may be adjusted in the top-bottom direction, and the rubber band holder units 440 may be brought into contact with or be detached from the pad 260 of the rubber band mounting unit 200.

With the plurality of supports 446 of the rubber band holder units 440 being in a protruded position, the expanded rubber band 100 is in close contact with the outer circumferential portions of the plurality of supports 446.

The plurality of cylinder units 444 and the plurality of rods 445 are radially arrayed about the lift cylinder 420, and the supports 446 are connected to the rods 445 of the cylinder units 444, respectively.

Each of the supports 446 is an arc-shaped plate, with a groove 448 being formed in the outer edge in order to facilitate the insertion of the rubber band 100, and a plurality of indentations 447 being formed in the outer circumferential portions.

Thus, when the supports of the plurality of supports 446 are fitted together, a substantially circular plate shape is obtained. When the plurality of supports 446 is converted into the circular plate in this manner, the rubber band 100 is brought into close contact with the outer circumferential portions of the plurality of supports 446, thereby forming a circular shape having an increased radius.

Bits 632 of a first rim 630 to be described later are inserted into the plurality of indentations 447, respectively.

FIG. 10 is an exploded perspective view of the "nonwoven fabric fusion unit" of the apparatus for manufacturing a hair cap according to an embodiment, FIG. 11 is an exploded perspective view of the "nonwoven fabric fusion unit" of the apparatus for manufacturing a hair cap according to an embodiment, FIG. 12 is an assembled cross-sectional view of the "nonwoven fabric fusion unit" of the apparatus for manufacturing a hair cap according to an embodiment, FIG. 13 is a cross-sectional view illustrating a state in which the support of the rubber band conveying unit of the nonwoven fabric fusion unit is inserted into the holder unit of the nonwoven fabric fusion unit, FIG. 14 is a view illustrating the support of the rubber band conveying unit of the "nonwoven fabric fusion unit" being held by the holder unit of the nonwoven fabric fusion unit, and FIG. 15 is a view illustrating a state in which a bonding operation is performed by the holder unit at the same time that the support of the rubber band conveying unit of the "nonwoven fabric fusion unit" is contracted.

The nonwoven fabric fusion unit 600 includes a suction unit 620 allowing the rubber band conveying unit 400 mounted with the rubber band 100 to be seated thereon and the nonwoven fabric 120 to be fixed thereto, a holder unit 640 provided on an outer circumferential portion of the suction unit 620 to hold a peripheral portion of the nonwoven fabric 120, and a bonding unit 680 bonding the peripheral portion of the nonwoven fabric in the holder unit 640.

The suction unit 620 includes: a turntable 622 having a dome-like convex shape, having a plurality of suction holes is formed therein a circumferential direction, and configured to seat the nonwoven fabric 120 thereon; and a suction force generator (not shown) including a suction hose 624 connected to the plurality of suction holes 623 and a vacuum pump generating suction force to the suction hose 624.

Thus, the suction force generated by the suction force generator may pull and fix the fabric, i.e. the nonwoven fabric 120, with a predetermined amount of force.

The holder unit 640 includes a first rim 630 having a hollow receptacle into which the suction unit 620 is inserted and being coupled to and in contact with an outer circumferential surface of the suction unit 620, a first lift 660 moving the first rim 630 up and down, a second rim 650 coupled to an outer circumferential surface of the first rim 630, and a second lift (670) moving the second rim 650 up and down.

The first lift 660 or the second lift (670) includes side plates 721 provided on both sides below the top surface of the workable T and support bars 720 provided on both sides further below the side plates 721.

Shafts 710 are coupled to while extending through the support bars 720. The top ends of the shafts 710 are fixedly coupled to bottom portions of the turntable 622 of the suction unit 620.

A first horizontal bar 662 is provided between below the turntable 622 and above the support bars 720, and is coupled to the shafts 710 while allowing the shafts 710 to extend therethrough.

First springs 711 are coupled to outer circumferential surfaces of the shafts 710. The top ends of the first springs 711 are supported on the bottom surface of the first horizontal bar 662, and the bottom ends of the first springs 711 are supported on the top surfaces of the support bars 720. Thus, when the lift cylinder 42 is in an off position, the first horizontal bar 662 may be moved upward by elastic force of the first springs, thereby moving the turntable 622 upward.

As illustrated in FIGS. 10 and 11, the first lift 660 includes a first actuator 661 including a lift rod 661a operating to protrude and retract in the top-bottom direction and connected to the bottom surface of the turntable 620, the first horizontal bar 662 connected to the lift rod 661a of the first actuator 661 via brackets 6612 to be movable up and down, and first vertical bars 663 vertically connected to both ends of the first horizontal bar 662, thereby being connected to the first rim 630.

Thus, when the actuator 661 is turned on and thus the lift rod 661a is retracted, the first horizontal bar 662 attached to the first actuator 661 moves downward and the first vertical bars 663 move downward, thereby moving the first rim 630 downward.

In a reverse order of the above, when the lift rod 661a of the first actuator 661 is in an off position, the first horizontal bar 720 is moved upward by expanding force of the first spring 711.

In addition, as illustrated in FIGS. 10 and 11, the second lift (670) includes a second actuator 671 including a lift rod operating to protrude and retract in the top-bottom direction and connected to the bottom surface of the turntable and a second vertical bar 673 by which the lift rod 671a of the second actuator 671 is connected to the second rim (670).

When the second actuator 671 is turned on and the lift rod 671a is protruded, the second rim (670) is moved upward. When the lift rod 671a is retracted, the second rim (670) is moved downward.

The above-described first and second actuators 661 and 671 may be pneumatic cylinders.

Each of the first rim 630 and the second rim 650 has a circular ring shape, with the cross-section thereof having substantially the shape of letter "F". The first rim 630 and the second rim 650 are coupled to each other such that the second rim 650 is in contact with the outer circumferential surface of the first rim 630.

Referring to FIG. 18, the plurality of bits 632 protrudes downward from the top surface of the first rim 630.

The second rim 650 has an annular projection 652 covering the top portion of the first rim 630. The inner edge of the annular projection 652 is bent downward, thereby forming a stepped portion 654.

The bits 632 of the first rim 630 are arc-shaped plates and are radially provided on the top surface of the first rim 630 at equal distances from each other.

The bits 632 are provided more inside than the inner surface of the stepped portion 654 so as to be in contact with the stepped portion 654 when the second rim 650 is moved downward.

The bits 632 are configured to catch and fix the rubber band 100 while being inserted into the indentations 447 of the supports 446. When the supports 446 are contracted, the rubber band 100 remain caught to the inner circumferential surface of the bits 632.

A space P may be provided in the inner surfaces of the bits 632, and a peripheral portion 128 of the nonwoven fabric 120 bent to accommodate the rubber band 100 therein may be inserted into the space P.

The bonding unit 680 is provided on the second rim 650. As described above, the bonding unit 680 serves to bond the peripheral portion of the nonwoven fabric 120 inserted between the bits 632 and the stepped portion 654 and, in a folded position, accommodating the rubber band 100 therein.

For example, the bonding unit 680 is an ultrasonic welder that fuses a molten portion, formed in a peripheral portion of the nonwoven fabric 120, by applying ultrasonic waves thereto.

The bonding unit 680 is not limited to the ultrasonic welder but may be a bonding machine using thermal fusion or a typical adhesive.

The drive unit 800 serves to reciprocally drive the rubber band conveying unit 400 between the rubber band mounting unit 200 and the nonwoven fabric fusion unit 600. The drive unit 800 includes an arm 820 to which the lift cylinder 420 of the rubber band conveying unit 400 is coupled and a power source 840 moving the rubber band conveying unit 400 to the nonwoven fabric fusion unit by rotating the arm 820.

The lift cylinder 420 is coupled to one end of the arm 820, while the power source 840 is provided on the other end of the arm 820.

The power source 840 includes a following gear (not shown) provided on the other end of the arm 820 and a motor (not shown) on which the main gear 341 engaged with the following gear is provided.

The main gear 341 is rotated in a forward direction or a reverse direction due to clockwise rotation or counterclockwise rotation of the motor. As the following gear connected to the main gear 341 is rotated in the forward or reverse direction, the arm 820 is rotated, thereby providing the reciprocation between the rubber band mounting unit 200 and the nonwoven fabric fusion unit 600.

Accordingly, after the rubber band 100 is mounted on the rubber band conveying unit 400 in the rubber band mounting unit 200, the rubber band conveying unit 400 is controlled to move to the nonwoven fabric fusion unit 600 by rotating the arm 820. After the rubber band 100 is fixed to the nonwoven fabric fusion unit 600, the rubber band conveying unit 400 is controlled again to move to the rubber band mounting unit 200.

The operation of an embodiment will be described as follows.

In a state in which the plurality of catching members 220 of the rubber band mounting unit 200 are gathered and contracted in the central portion of the pad 260, the rubber band 100 is caught and mounted on the plurality of catching members 220.

Afterwards, in response to the operation of the catching member operating unit 300, the catching members 220 move to expand the rubber band 100 into a substantially octagonal shape.

Subsequently, referring to FIG. 15, the rubber band holder units 440 of the rubber band conveying unit 400 moves downward, so that the supports 446 are in contact with the pad 260.

Afterwards, the plurality of catching members 220 of the rubber band mounting unit 200 moves to the central portion again, and the rubber band 100 is hung on the supports 446.

The rubber band 100 may be separated from the catching members 220 and be mounted on and in close contact with the grooves 448 in the outer circumferential portions of the supports 446 (see FIG. 16).

Since there is no gap between the bottom surface of each of the supports 446 and the pad 260, there is no risk that the rubber band 100 may be lost.

Subsequently, after the rubber band 100 is in close contact with the supports 446 of rubber band holder units 440, the rubber band conveying unit 400 moves upward to be spaced apart from the pad 260.

Afterwards, in a state in which the rubber band conveying unit 400 has moved upward, the rubber band conveying unit 400 moves to the nonwoven fabric fusion unit 600 along the rail bars 412 of the movable table 410.

After the rubber band conveying unit 400 has moved above the nonwoven fabric fusion unit 600, the rubber band holder units 440 moves downward in response to the downward movement of the lift cylinder 420 so as to move downward into contact with the top surface of the nonwoven fabric 120 on which the suction unit 620 is seated.

Thereafter, the plurality of cylinder units 444 is simultaneously driven so as to protrude each of the supports 446 outward, thereby increasing the diameter.

Here, as the rubber band 100 is expanded and the circumferential periphery of the nonwoven fabric 120 is pushed by the supports 446 so as to be enter the gap between the first rim 630 of holder unit 640 and the second rim 650, so that the periphery of the nonwoven fabric 120 is rolled to accommodate the rubber band 100 (see FIG. 13).

Afterwards, the first rim 630 is moved downward, and the bits 632 are inserted into the indentations 447 of the 446. Then, the portion in which the rubber band 100 is accommodated and rolled is located on the outer surfaces of the bits 632 (see FIG. 14).

Thereafter, due to the entrance of the supports 446, the diameter is reduced, and the supports 446 are spaced apart from the first and second rims 630 and 650.

Subsequently, the second rim 650 moves downward to bond the rolled peripheral portion of the nonwoven fabric 120 sandwiched between the first rim 630 and the second rim 650 (see FIG. 15).

That is, the bonding unit 680 in a turned-on state bonds the rolled peripheral portion of the nonwoven fabric 120 in which the rubber band 100 is accommodated by pressing and fusing the rolled peripheral portion.

It should be understood that the above-described fusion includes a variety of methods, such as high-frequency fusion, ultrasonic fusion, and thermal bonding.

Thus, the top surface and the bottom surface of the rolled peripheral portion of the nonwoven fabric 120 may be bonded to each other, thereby fixing the rubber band 100.

Afterwards, after the rubber band conveying unit 400 has moved upward, when the arm 820 rotates, the rubber band conveying unit 400 is moved to the rubber band mounting unit 200.

When the second rim 650 moves upward, a hair cap A in which the rubber band 100 is fixed to the nonwoven fabric is released and packed.

In addition, FIG. 25 is an exploded perspective view of the "nonwoven fabric supply section" of the apparatus for manufacturing a hair cap according to an embodiment, FIG. 26 is an exploded perspective view of the supply unit of the nonwoven fabric supply section, FIGS. 27 and 28 are plan views sequentially illustrating a distance adjustment operation of the supply unit, and FIGS. 29 and 30 are plan views illustrating forward and backward operations of the supply unit.

As illustrated in FIGS. 1 and 25 to 30, the nonwoven fabric supply section 900 includes:

rail members 910 provided in parallel on both sides to be perpendicular to the worktable T;

a roll 930 on which the nonwoven fabric 120 is wound;

a supply unit 920 operating forward and backward along the rail members 910 to move the nonwoven fabric 120 forward by holding the nonwoven fabric 120 so that the nonwoven fabric 120 is removed from the roll 930;

holder units 940 provided on ends of the supply unit 920 and operating to hold or release the nonwoven fabric 120; and a drive unit 950 including a drive cylinder 952 provided on a side surface of one of the rail members 910 to drive the supply unit 920 forward and backward along the rail members 910 and a drive rod 954 provided on the drive cylinder 952 and coupled to one end of the rail member 910 to protrude from and retract into the drive cylinder 952.

The supply unit 920 includes:

a first cylinder 922 provided on a plate 921 connecting predetermined ends of both the rail members 910 and including a rod 9221 operating to move forward and backward;

a bar 923 coupled to the rod 9221 of the first cylinder 922; L-shaped angle links 924, with predetermined ends thereof being hinge-coupled to both ends of the bar 923; arms 925 hinge-coupled to other ends of the angle links 924, provided perpendicular to the worktable T, and having a predetermined length; and connecting rods 926 coupled to the rail members 910 via rollers so as to be movable.

The arms 925 are coupled to the connecting rods 926, respectively, to be parallel thereto. The both arms 925 operate to contract or spread in concert with forward and backward operations of the rod 9221 of the first cylinder 922.

Each of the arms 925 has guide shafts 9251 on outer surfaces thereof. The guide shafts 9251 of the arm 925 extend through and are coupled to the corresponding connecting rod 926.

Rollers are provided on outer portions of each of the connecting rods 926. With the rollers being coupled to the rail members 910, the connecting rods 926 may slide forward and backward.

In addition, FIG. 31 is an exploded perspective view of the holder unit of the nonwoven fabric supply section, and FIGS. 32 and 33 are plan views sequentially illustrating a distance adjustment operation of the supply unit.

The holder units 940 simultaneously hold both ends of the nonwoven fabric 120, thereby enabling forward and backward movements.

Each of the holder units 940 includes a second cylinder 942 coupled to one end of the corresponding arm 925, a link piece 943 hinge-coupled to a rod 9421 of the second cylinder 942, a second link piece 944 perpendicularly hinge-coupled to one end of the link piece 943, a third link piece 945 hinge-coupled to one end of the second link piece 944 to be parallel thereto, and a clip piece 946 provided on one end of the corresponding connecting rod 926 so as to face the third link piece 945.

Described by referring to FIGS. 1, 2, and 29 again, a nonwoven fabric cutting unit 690 is further provided. The nonwoven fabric cutting unit 690 cuts the nonwoven fabric 120 in accordance with the shape of the second rim 650 after the nonwoven fabric 120 has been seated on the second rim 650 of the nonwoven fabric fusion unit 600.

The nonwoven fabric cutting unit 690 includes:

a hot wire 692 provided on the top surface of the second rim 650 in the circumferential direction;

a power supply (not shown) heating the hot wire 692 by applying electric power;

a pressing plate 694 seated on the top surface of the second rim 650, having a through-hole 697 having the same diameter as that of the second rim 650, and connecting portions 695 provided on both ends thereof to extend beyond the both rail bars 412 of the movable table 410; and lift drive units 696 provided on both the rail bars 412 of the movable table 410, respectively, to move the pressing plate 694 up and down, thereby causing pressing and releasing operations.

Each of the lift drive units 696 is a pneumatic cylinder operating to move a rod thereof up and down. The rod is mounted on the connecting portion 695 of the corresponding pressing plate 694.

A detection unit 69, by which downward movement of the rods of the lift drive units 696 are stopped, is provided.

The detection unit 69 includes a bracket 691 on which the rod of the corresponding lift drive unit 696 is mounted, a contact rod 692 protruding from one side of the bracket 691, and a sensor 693 provided on the outer surface of the corresponding connecting portion 695 of the pressing plate 694 so as to be in contact with the contact rod 692.

Thus, when the rods protrude due to pneumatic pressure supplied to the lift drive units 696, the pressing plate 694 move downward. When the rods retract, the pressing plate 694 moves upward.

When the pressing plate 694 moves downward, the bracket 691 connected to the rods of the lift drive units 696 moves downward, and the contact rod 692 comes into contact with the sensor 693, a signal instructing that the pneumatic pressure applied to the lift drive units 696 be stopped is transmitted.

As illustrated in FIG. 24, when the pressing plate 694 moves downward, a planar portion surrounding to the through-hole 697 is seated on the top surface of the second rim 650 to press the nonwoven fabric 120. Thus, the operation of cutting the nonwoven fabric 120 by the hot wire 692 of the nonwoven fabric cutting unit 690 may be facilitated.

That is, in a state in which the pressing plate 694 has pressed the nonwoven fabric 120, the hot wire 692 starts to generate heat to melt the nonwoven fabric 120. Accordingly, the nonwoven fabric 120 is cut in accordance with the shape thereof, whereby a circular primary fabric is completed.

In addition, the nonwoven fabric fusion unit 600 may be configured such that the rubber band conveying unit 400 mounted with the rubber band 100 may be seated thereon. The nonwoven fabric fusion unit 600 may fixed the nonwoven fabric 120 using the suction unit 620 and bond the peripheral portion of the nonwoven fabric by holding the peripheral portion of the nonwoven fabric 120 using the holder unit provided on the outer circumferential portion of the suction unit 620.

The suction unit 620 includes: the turntable 622 having a dome-like convex shape, wherein the plurality of suction holes 623 is formed in the turntable 622 in the circumferential direction, thereby allowing the nonwoven fabric 120 to be seated thereon; and the suction force generator (not shown) including the suction hose 624 connected to the plurality of suction holes 623 and the vacuum pump generating suction force to the suction hose.

Since the suction force generated by the suction force generator may enable suction through the plurality of suction holes 623 of the turntable 622, the nonwoven fabric 120 seated on the turntable 622 may be pulled and fixed.

In addition, referring to FIGS. 17 to 22, a lift power source 4 moving the turntable 622 up and down is provided.

The lift power source 4 includes:

a lift cylinder 42 vertically provided and including a rod operating to protrude and retract in a longitudinal direction thereof;

a transverse bar 44 coupled to the rod of the lift cylinder 42; and crossbars 45 vertically connected to both ends of the transverse bar 44 and mounted on the bottom surface of the turntable 622.

Thus, when the rod retracts, the turntable 622 moves downward. When the rod protrudes, the turntable 622 moves upward.

The lift cylinder 42 is coupled to the central portion of a mounting bar 725 attached to the support bars 720 and is disposed such that the rod is directed upward.

An auxiliary elastic member 46 including springs 47 is further provided. The springs 47 are provided on both sides of the lift cylinder 42 and generate force for pushing the transverse bar 44 upward.

In the auxiliary elastic member 46, the springs 47 are mounted on the support bars 720, the bottom ends of the springs 47 are fixed to the support bars 720, and the top ends of the springs 47 are fixed to the transverse bar 44.

Thus, the springs 47 may push the transverse bar 44 upward by expanding force thereof, thereby assisting in the force for pushing the turntable 622 upward.

As illustrated in FIG. 19, when the turntable 622 moves upward, the height of the turntable 622 is the same as that of the second rim 650. Thus, the nonwoven fabric 120 seated on the turntable 622 may be stably placed while being spread flat.

Thus, a change in the shape in which the nonwoven fabric 120 is corrugated or moves from a designated position may be prevented.

In addition, the suction force of the turntable 622 may fix the nonwoven fabric 120, thereby reliably maintaining the shape of the nonwoven fabric 120.

In a state in which the nonwoven fabric 120 is placed, when the rubber band conveying unit 400 is located on the top surface of the turntable 622 and the turntable 622 moves downward, the rubber band conveying unit 400 also moves downward to be seated on top of the turntable 622.

Afterwards, the plurality of supports 446 of the rubber band holder units 440 are protruded and, in a state in which the rubber band 100 is expanded, are inserted between the first rim 630 and the second rim 650. Consequently, the outer peripheral surface of the nonwoven fabric 120 is rolled to surround the rubber band 100 (see FIG. 20).

Afterwards, a process of bonding the outer circumferential surface of the nonwoven fabric 120 surrounding the rubber band 100 is performed.

Since this feature has been described above with reference to FIG. 21, a repetitive description thereof will be omitted.

In addition, FIG. 34 is a front view illustrating a downward movement of the contracted "collecting unit" in the apparatus for manufacturing a hair cap according to an embodiment, and FIG. 35 is a front view illustrating a holding operation of the "collecting unit" after having moved downward in the apparatus for manufacturing a hair cap according to an embodiment.

The collecting unit 470 mounted on the distal portion of the movable table 410 of the rubber band conveying unit 400 is further provided. The collecting unit 470 holds and collects the hair cap H to which the fusion has been accomplished by the nonwoven fabric fusion unit 600.

The collecting unit 470 includes: the connecting bar 472 mounted on the distal portions of the crossbars 417 of the frame 414 of the movable table 410 and provided on top of the frame 414 to have an inverted U-shape; a lift cylinder 473 vertically mounted on the central and top portion of the connecting bar 472 and including a rod configured to protrude or retract in the upward direction; a bracket 4731 connected to the rod of the lift cylinder 473; a height-adjustment cylinder 4732 mounted on the bracket 4731 and driving a rod to protrude or retract in the downward direction; a guide rod 474 connected to the rod of the height-adjustment cylinder 4732 and located above the turntable 622 of the nonwoven fabric fusion unit 600; a ring 475 fitted around the guide rod 474 and movable up and down; a plurality of link rods 476 hinge-coupled to the ring 475 and extending upward; a plurality of holding rods 477 hinge-coupled to and extending downward from the top portion of the guide rod 474 and hinge-coupled to the link rods 476. The plurality of holding rods 477 are inserted into an insert opening of the hair cap H and are spread outward so that the collecting unit 470 holds the hair cap H.

That is, when the rod of the cylinder 473 is protruded, i.e. has moved downward, the guide rod 474 moves downward, the link rods 476 are folded toward the guide rod 474, and the holding rods 477 hinge-coupled to the link rods 476 are folded. Consequently, the radius defined by the plurality of holding rods 477 is reduced so that the holding rods 477 may be inserted into the insert opening of the hair cap H.

Afterwards, when the rod of the cylinder 473 is retracted, the guide rod 474 moves upward and the link rods 476 are spaced apart from the guide rod 474 to be spread to an angle ranging from about 30° to about 40°. Consequently, the holding rods 477 hinge-coupled to the link rods 476 are also spread outward, thereby increasing the radius defined by the plurality of holding rods 477.

Since the insert opening of the hair cap H is increased along with an increase in the radius defined by the plurality of holding rods 477 as described above, the rubber band 100 may be in close contact with the plurality of holding rods 477 while being expanded, thereby being prevented from being released from the holding rods 477.

Accordingly, since the plurality of holding rods 477 is spread while moving upward, i.e. the plurality of holding rods 477 moves upward in a state in which the hair cap H is held thereby, the collecting operation is completed.

Although the exemplary embodiments of the present disclosure have been described for illustrative purposes, those skilled in the art will appreciate that various modifications and alterations are possible, without departing from the spirit and scope of the present disclosure, and such modifications and alterations shall belong to the accompanying claims.

DESCRIPTION OF THE REFERENCE NUMERALS IN THE DRAWINGS

100: rubber band,
200: rubber band mounting unit
220: catching member,
260: pad
270: slit,
300: catching member operating unit
310: first pinion gear,
320: second pinion gear
340: power source,
400: rubber band conveying unit
410: movable table,
420: lift cylinder
440: rubber band holder unit,
444: cylinder unit
446: support,
600: nonwoven fabric fusion unit
620: suction unit,
640: holder unit
630: first rim,
650: second rim
661: first actuator,
662: first horizontal bar
663: first vertical bar,
(670): second lift
680: bonding unit,
720: support bar
800: drive unit,
820: arm
840: power source

The invention claimed is:

1. An apparatus for manufacturing a hair cap to be worn on a head, the apparatus comprising:
a worktable (T);
a rubber band mounting unit (200) provided on a portion of a top surface of the worktable (T) and configured to outwardly expand a rubber band (100) so as to increase the diameter thereof;
a rubber band conveying unit (400) provided on the top surface of the worktable (T) and configured to convey the diameter-increased rubber band (100) to one side by holding the rubber band (100);
a nonwoven fabric cutting unit (690) provided on top surface of the worktable (T) and configured to cut the nonwoven fabric (120);
a nonwoven fabric fusion unit (600) provided on the top surface of the worktable (T) and configured to join the rubber band (100), conveyed by the rubber band conveying unit (400), to an outer circumferential portion of a nonwoven fabric (120) after the nonwoven fabric (120) is seated; and
a drive unit (800) configured to drive the rubber band conveying unit (400) so as to reciprocate between the rubber band mounting unit (200) and the nonwoven fabric fusion unit (600).

2. The apparatus of claim 1, wherein the rubber band mounting unit (200) comprises:
a plurality of catching members (220) provided on a circle and configured to increase or reduce distances thereof while moving from a center to outer circumferential portions;

a catching member operating unit (300) configured to cause the rubber band (100) to be caught by the plurality of catching members (220) and cause each of the catching members (220) to increase the distances thereof, so that the rubber band (100) is expanded; and a pad (260) to which the plurality of catching members 220 is coupled, the pad (260) having a plurality of slits (270) configured to guide a spreading or contracting operation of the plurality of catching members (220).

3. The apparatus of claim 1, wherein the rubber band conveying unit (400) comprises:

a movable table (410) disposed on top of the worktable (T), wherein the movable table (410) comprises parallel rail bars (412) disposed on both sides to cover top portions of the rubber band mounting unit (200) and the nonwoven fabric fusion unit (600), each of the rail bars (412) comprising a rail, and a frame (414) comprising rollers coupled to the rails of the both rail bars (412) to be movable in a linear direction;

a lift cylinder (420) mounted on the frame (414) of the movable table (410) and comprising a rod operating to move up and down; and rubber band holder units (440), wherein each of the rubber band holder units (440) comprises:

a fixing plate (442) connected to the rod of the lift cylinder (420);

a plurality of cylinder units (444) radially disposed on a top surface of the fixing plate (442) and respectively comprising a rod (445) operating to protrude and retract in response to changes in pneumatic pressure; and a plurality of supports (446) connected to the rods (445) of the cylinder units (444), respectively.

4. The apparatus of claim 1, wherein the worktable (T) comprises a nonwoven fabric supply section (900) supplying the nonwoven fabric (120) to the nonwoven fabric fusion unit (600), the nonwoven fabric supply section (900) comprising:

rail members (910) provided on both sides to be perpendicular to the worktable (T);

a roll (930) on which the nonwoven fabric (120) is wound;

a supply unit (920) configured to operate forward and backward along the rail members (910) to move the nonwoven fabric (120) forward by holding the nonwoven fabric (120) so that the nonwoven fabric (120) is removed from the roll (930);

holder units (940) provided on ends of the supply unit (920) and operating to hold or release the nonwoven fabric (120); and a drive unit (950) comprising a drive cylinder (952) provided on a side surface of one of the rail members (910) to drive the supply unit (920) forward and backward along the rail members (910) and a drive rod (954) provided on the drive cylinder (952) and coupled to one end of the rail member (910) to protrude from and retract into the drive cylinder (952).

5. The apparatus of claim 4, wherein the supply unit (920) comprises:

a first cylinder (922) provided on a plate (921) connecting predetermined ends of both the rail members (910) and comprising a rod (9221) operating to move forward and backward;

a bar (923) coupled to the rod (9221) of the first cylinder (922);

L-shaped angle links (924), with predetermined ends thereof being hinge-coupled to both ends of the bar (923);

arms (925) hinge-coupled to other ends of the angle links (924) and provided perpendicular to the worktable (T); and connecting rods (926) coupled to the rail members ((910) via rollers so as to be movable, wherein the arms (925) are coupled to the connecting rods (926), respectively, to be parallel thereto and are configured to contract or spread in concert with forward and backward operations of the rod (9221) of the first cylinder (922).

6. The apparatus of claim 5, wherein each of the holder units (940) comprises:

a second cylinder (942) coupled to one end of the corresponding arm (925);

a link piece (943) hinge-coupled to a rod (9421) of the second cylinder (942);

a second link piece (944) perpendicularly hinge-coupled to one end of the link piece (943);

a third link piece (945) hinge-coupled to one end of the second link piece (944) to be parallel thereto; and a clip piece (946) provided on one end of the corresponding connecting rod (926) so as to face the third link piece (945).

7. The apparatus of claim 1, wherein the nonwoven fabric fusion unit (600) comprises:

a suction unit (620) allowing the rubber band conveying unit (400) mounted with the rubber band (100) to be seated thereon and the nonwoven fabric (120) to be fixed thereto;

a holder unit (640) provided on an outer circumferential portion of the suction unit (620) to hold a peripheral portion of the nonwoven fabric (120);

a nonwoven fabric cutting unit (690) configured to cut the nonwoven fabric (120);

a bonding unit (680) configured to bond the peripheral portion of the nonwoven fabric in the holder unit (640), wherein the suction unit (620) comprises:

a turntable (622) having a plurality of suction holes (623) formed therein and configured to seat the nonwoven fabric (120) thereon; and a suction force generator comprising a suction hose connected to the plurality of suction holes (623) and a vacuum pump generating suction force to the suction hose, the holder unit (640) comprises:

a first rim (630) having a hollow receptacle into which the suction unit (620) is inserted and being coupled to and in contact with an outer circumferential surface of the suction unit (620);

a first lift (660) configured to move the first rim (630) up and down;

a second rim (650) coupled to an outer circumferential surface of the first rim (630); and a second lift (670) configured to move the second rim (650) up and down.

8. The apparatus of claim 7, wherein the nonwoven fabric cutting unit (690) is configured to cut the nonwoven fabric (120) seated on the second rim (650) in accordance with the shape of the second rim (650), and comprises:

a hot wire (692) provided on a top surface of the second rim (650) in a circumferential direction;

a power supply (693) configured to heat the hot wire (692) by applying electric power;

a pressing plate (694) seated on the top surface of the second rim (650), having a through-hole (697) having the same diameter as that of the second rim (650), and connecting portions (695) provided on both ends thereof to extend beyond the both rail bars (412) of the movable table (410); and a power source (696) configured to move the pressing plate (694) up and down, thereby causing pressing and releasing.

9. The apparatus of claim 1, further comprising a collecting unit (470) configured to hold and collect a hair cap (H) to which fusion has been accomplished by the nonwoven fabric fusion unit (600), wherein the collecting unit (470) comprises:
a connecting bar (472) mounted on a distal portion of a movable table (410) and provided on a frame (414);
a lift cylinder (473) vertically mounted on a central and top portion of the connecting bar (472) and comprising a rod configured to protrude or retract in an upward direction;
a guide rod (474) connected to the rod of the cylinder (473) and located above a turntable (622) of the nonwoven fabric fusion unit (600);
a ring (475) fitted around the guide rod (474) and configured to move up and down;
a plurality of link rods (476) hinge-coupled to the ring (475) and extending upward; and
a plurality of holding rods (477) hinge-coupled to and extending downward from a top portion of the guide rod (474) and hinge-coupled to the link rods (476),
wherein the plurality of holding rods (477) are inserted into an insert opening of the hair cap (H) while being spread outward so as to hold the hair cap (H).

10. The apparatus of claim 1, further comprising a rubber band forming unit (2) provided on the worktable (T) and configured to form the rubber band (100) to have a circular shape, increase the diameter of the rubber band (100) to an appropriate size, and supply the rubber band (100) to a rubber band mounting unit (200).

11. The apparatus of claim 10, wherein the rubber band forming unit (2) comprises:
a turntable (22) rotatably mounted on a top plate of the worktable (T) via a bearing and comprising a plurality of rollers (21) provided on a top surface thereof in a circumferential direction;
a bobbin (23) provided at one side on top of the turntable (22) and configured to supply the rubber band (100) to be wound on a plurality of rollers (21);
a rotary shaft (24) coupled to a bottom of a central portion of the turntable (22);
a drive unit (10) rotating the rotary shaft (24);
a cutter provided at the other side on top of the turntable (22) and configured to cut one end of the circular rubber band (100) after the turntable (22) is rotated once by power of the drive unit (10);
a bonding device provided on one side of the cutter to bond both ends of the rubber band (100) after a cutting operation; and a rubber band conveyor (3) configured to remove the rubber band (100) from the plurality of rollers (21) and convey the rubber band (100) to the rubber band mounting unit (200).

12. The apparatus of claim 11, wherein the drive unit (10) comprises:
a pinion gear (25) mounted on the rotary shaft (24); and
a pneumatic cylinder (102) comprising a gear rod (101) having a rack gear (103) engaged with the pinion gear (25).

13. The apparatus of claim 11, wherein the rubber band conveyor (3) comprises:
a first cylinder (33) vertically provided above the turntable (22), comprising a rod configured to move up and down, and mounted on top of a bracket (31) mounted on a frame;
a second cylinder (32) mounted on the rod of the first cylinder (33), provided below the bracket, and comprising a rod configured to move up and down; and
a holder unit (H) comprising a plurality of first and second link pieces (35, 36) hinge-coupled to the rod of the second cylinder (32).

14. The apparatus of claim 11, wherein the turntable (22) has plurality of insert holes (221) extending therethrough,
the plurality of second link pieces (36) are inserted into corresponding insert holes of the plurality of insert holes (221), respectively, thereby reaching more-deeply lowered positions inside the rubber band (100) wound on the plurality of rollers (222).

15. The apparatus of claim 8, further comprising a detection unit (69) configured to stop a downward movement of rods of the lift drive units (696),
wherein the detection unit (69) comprises a bracket (691) on which the rod of the corresponding lift drive unit (696) is mounted, a contact rod (692) protruding from one side of the bracket (691), and a sensor (693) provided on an outer surface of the corresponding connecting portion (695) of the pressing plate (694) so as to be in contact with the contact rod (692).

16. The apparatus of claim 11, further comprising a storage (5) provided on one side of the turntable (22) and configured to store and cure a plurality of rubber bands.

17. The apparatus of claim 12, wherein the storage (5) comprises:
a mounting turntable (52) rotatably mounted on the top plate of the worktable (T);
a plurality of rubber band mounts (54) provided on the mounting turntable (52); and
a rubber band conveyor (3) configured to remove the rubber band (100) from each of the rubber band mounts (54) and convey the rubber band (100) to the rubber band mounting unit (200).

* * * * *